(12) United States Patent
Sheppard et al.

(10) Patent No.: US 11,941,646 B2
(45) Date of Patent: Mar. 26, 2024

(54) METHODS AND APPARATUS TO ESTIMATE POPULATION REACH FROM MARGINALS

(71) Applicant: The Nielsen Company (US), LLC, New York, NY (US)

(72) Inventors: Michael Sheppard, Holland, MI (US); DongBo Cui, New York, NY (US); David Forteguerre, Brooklyn, NY (US); Jessica Lynn White, Plant City, FL (US); Edward Murphy, North Stonington, CT (US)

(73) Assignee: The Nielsen Company (US), LLC, New York, NY (US)

( * ) Notice: Subject to any disclaimer, the term of this patent is extended or adjusted under 35 U.S.C. 154(b) by 71 days.

(21) Appl. No.: 17/472,215

(22) Filed: Sep. 10, 2021

(65) Prior Publication Data

US 2022/0084052 A1 Mar. 17, 2022

Related U.S. Application Data

(60) Provisional application No. 63/077,418, filed on Sep. 11, 2020.

(51) Int. Cl.
*G06Q 30/02* (2023.01)
*G06Q 30/0201* (2023.01)
(Continued)

(52) U.S. Cl.
CPC ..... *G06Q 30/0201* (2013.01); *G06Q 30/0205* (2013.01); *H04N 21/25883* (2013.01)

(58) Field of Classification Search
None
See application file for complete search history.

(56) References Cited

U.S. PATENT DOCUMENTS

| | | |
|---|---|---|
| 610,637 A | 9/1898 | Powell |
| 3,070,139 A | 12/1962 | Witschi et al. |

(Continued)

FOREIGN PATENT DOCUMENTS

| | | |
|---|---|---|
| JP | 2015529870 A | 10/2015 |
| JP | 2015529970 A | 10/2015 |

(Continued)

OTHER PUBLICATIONS

Sheppard et al., "Reach Estimate using Information Theory," Jul. 14, 2020, 13 pages.

(Continued)

*Primary Examiner* — Alan Torrico-Lopez

(57) ABSTRACT

Methods, apparatus, systems, and articles of manufacture are disclosed to estimate population reach from marginals. Example apparatus disclosed herein are to determine an audience relationship value based on first audience exposure values for a recorded audience of a media and a first de-duplicated audience value for the recorded audience of the media, determine bounds of a pseudo universe estimate of a population audience of the media based on the audience relationship value and second audience exposure values for the population audience of the media, and iteratively determine the pseudo universe estimate of the population audience and a second de-duplicated audience value for the population audience of the media based on the audience relationship value and the second audience exposure values, the pseudo universe estimate of the population audience to be within the bounds.

20 Claims, 11 Drawing Sheets

(51) Int. Cl.
   *G06Q 30/0204*     (2023.01)
   *H04N 21/258*      (2011.01)

(56) References Cited

U.S. PATENT DOCUMENTS

| | | |
|---|---|---|
| 5,956,692 A | 9/1999 | Foley |
| 6,029,045 A | 2/2000 | Picco et al. |
| 6,108,637 A | 8/2000 | Blumenau |
| 6,460,025 B1 | 10/2002 | Fohn et al. |
| 6,775,663 B1 | 8/2004 | Kim |
| 7,197,472 B2 | 3/2007 | Conkwright et al. |
| 7,746,272 B2 | 6/2010 | Vollath |
| 7,865,916 B2 | 1/2011 | Beser et al. |
| 7,954,120 B2 | 5/2011 | Roberts et al. |
| 8,087,041 B2 | 12/2011 | Fu et al. |
| 8,112,301 B2 | 2/2012 | Harvey et al. |
| 8,149,162 B1 | 4/2012 | Pauls |
| 8,171,032 B2 | 5/2012 | Herz |
| 8,185,456 B2 | 5/2012 | LeClair et al. |
| 8,200,693 B2 | 6/2012 | Steele et al. |
| 8,214,518 B1 | 7/2012 | Bertz |
| 8,370,489 B2 | 2/2013 | Mazumdar et al. |
| 8,423,406 B2 | 4/2013 | Briggs |
| 8,453,173 B1 | 5/2013 | Anderson et al. |
| 8,619,652 B2 | 12/2013 | Singh et al. |
| 8,619,892 B2 | 12/2013 | Vetter et al. |
| 8,874,652 B1 | 10/2014 | Pecjak et al. |
| 8,913,023 B2 | 12/2014 | Li et al. |
| 8,930,701 B2 | 1/2015 | Burbank et al. |
| 8,973,023 B1 | 3/2015 | Rao et al. |
| 9,070,139 B2 | 6/2015 | Zhang |
| 9,094,710 B2 | 7/2015 | Lee et al. |
| 9,111,186 B2 | 8/2015 | Blasinski et al. |
| 9,224,094 B2 | 12/2015 | Oliver et al. |
| 9,236,962 B2 | 1/2016 | Hawkins et al. |
| 9,237,138 B2 | 1/2016 | Bosworth et al. |
| 9,420,320 B2 | 8/2016 | Doe |
| 9,529,836 B1 | 12/2016 | Hale |
| 10,045,057 B2 | 8/2018 | Shah et al. |
| 10,070,166 B2 | 9/2018 | Chaar et al. |
| 10,313,752 B2 | 6/2019 | Nagaraja Rao et al. |
| 10,382,818 B2 | 8/2019 | Sheppard et al. |
| 10,491,696 B2 | 11/2019 | Gierada |
| 10,602,224 B2 | 3/2020 | Sullivan et al. |
| 10,609,451 B2 | 3/2020 | de Andrade |
| 10,681,414 B2 | 6/2020 | Sheppard et al. |
| 10,728,614 B2 | 7/2020 | Sheppard et al. |
| 10,743,064 B2 | 8/2020 | Berezowski et al. |
| 10,856,027 B2 | 12/2020 | Sheppard et al. |
| 11,115,710 B2 | 9/2021 | Sheppard et al. |
| 11,140,449 B2 | 10/2021 | Sullivan et al. |
| 11,216,834 B2 | 1/2022 | Sheppard et al. |
| 11,323,772 B2 | 5/2022 | Sheppard et al. |
| 11,425,458 B2 | 8/2022 | Sheppard et al. |
| 11,438,662 B2 | 9/2022 | Sullivan et al. |
| 11,481,802 B2 | 10/2022 | Sheppard et al. |
| 11,483,606 B2 | 10/2022 | Sheppard et al. |
| 11,523,177 B2 | 12/2022 | Sheppard et al. |
| 11,553,226 B2 | 1/2023 | Sheppard et al. |
| 2002/0123928 A1 | 9/2002 | Eldering et al. |
| 2003/0037041 A1 | 2/2003 | Hertz |
| 2004/0001538 A1 | 1/2004 | Garrett |
| 2004/0049549 A1 | 3/2004 | Slattery et al. |
| 2004/0059549 A1 | 3/2004 | Kropaczek et al. |
| 2006/0190318 A1 | 8/2006 | Downey et al. |
| 2007/0087756 A1 | 4/2007 | Hoffberg |
| 2008/0028006 A1 | 1/2008 | Liu et al. |
| 2008/0228543 A1 | 9/2008 | Doe |
| 2008/0300965 A1 | 12/2008 | Doe |
| 2008/0301746 A1 | 12/2008 | Wiser et al. |
| 2008/0313017 A1 | 12/2008 | Totten |
| 2010/0161385 A1 | 6/2010 | Karypis et al. |
| 2010/0191723 A1 | 7/2010 | Perez et al. |
| 2011/0015992 A1 | 1/2011 | Liffiton et al. |
| 2011/0196733 A1 | 8/2011 | Li et al. |
| 2012/0023522 A1 | 1/2012 | Anderson et al. |
| 2012/0025930 A1 | 2/2012 | Gilliland et al. |
| 2012/0052930 A1 | 3/2012 | McGucken |
| 2012/0066410 A1 | 3/2012 | Stefanakis et al. |
| 2012/0072940 A1 | 3/2012 | Fuhrer |
| 2012/0110027 A1 | 5/2012 | Falcon |
| 2012/0254911 A1 | 10/2012 | Doe |
| 2013/0138743 A1 | 5/2013 | Amento et al. |
| 2013/0198125 A1 | 8/2013 | Oliver et al. |
| 2013/0254787 A1 | 9/2013 | Cox et al. |
| 2013/0290233 A1 | 10/2013 | Ferren et al. |
| 2013/0339991 A1 | 12/2013 | Ricci |
| 2013/0346033 A1 | 12/2013 | Wang et al. |
| 2014/0101685 A1 | 4/2014 | Kitts et al. |
| 2014/0112557 A1 | 4/2014 | Santamaria-Pang et al. |
| 2014/0278933 A1 | 9/2014 | McMillan |
| 2014/0280891 A1 | 9/2014 | Doe |
| 2014/0337104 A1 | 11/2014 | Splaine et al. |
| 2014/0358676 A1 | 12/2014 | Srivastava et al. |
| 2015/0032310 A1 | 1/2015 | Zettel et al. |
| 2015/0095138 A1 | 4/2015 | Rao et al. |
| 2015/0179953 A1 | 6/2015 | Mujica-Fernaud et al. |
| 2015/0180989 A1 | 6/2015 | Seth |
| 2015/0186403 A1 | 7/2015 | Srivastava et al. |
| 2015/0193813 A1 | 7/2015 | Toupet et al. |
| 2015/0332310 A1 | 11/2015 | Cui et al. |
| 2015/0332317 A1 | 11/2015 | Cui et al. |
| 2016/0012314 A1 | 1/2016 | Ramamurthy et al. |
| 2016/0086208 A1 | 3/2016 | Oliver et al. |
| 2016/0134934 A1 | 5/2016 | Jared et al. |
| 2016/0162955 A1 | 6/2016 | O'Kelley et al. |
| 2016/0165277 A1 | 6/2016 | Kirillov et al. |
| 2016/0232563 A1 | 8/2016 | Perez et al. |
| 2016/0233563 A1 | 8/2016 | Oshima et al. |
| 2016/0249098 A1 | 8/2016 | Pecjak et al. |
| 2016/0269783 A1 | 9/2016 | Mowrer et al. |
| 2016/0323616 A1 | 11/2016 | Doe |
| 2016/0373820 A1 | 12/2016 | Meyer et al. |
| 2016/0379246 A1 | 12/2016 | Sheppard et al. |
| 2017/0006342 A1 | 1/2017 | Nagaraja Rao et al. |
| 2017/0034594 A1 | 2/2017 | Francis et al. |
| 2017/0155956 A1 | 6/2017 | Nagaraja Rao et al. |
| 2017/0187478 A1 | 6/2017 | Shah et al. |
| 2017/0213243 A1 | 7/2017 | Dollard |
| 2017/0300911 A1 | 10/2017 | Alnajem |
| 2018/0073933 A1 | 3/2018 | Keskin et al. |
| 2018/0189950 A1 | 7/2018 | Norouzi et al. |
| 2018/0225709 A1 | 8/2018 | Ferber et al. |
| 2018/0249208 A1 | 8/2018 | Sheppard et al. |
| 2018/0249210 A1* | 8/2018 | Sheppard .......... H04N 21/44224 |
| 2018/0249211 A1* | 8/2018 | Sheppard .......... G06Q 30/0201 |
| 2018/0249214 A1 | 8/2018 | Sullivan et al. |
| 2018/0315060 A1 | 11/2018 | Sheppard et al. |
| 2018/0332177 A1 | 11/2018 | Shah et al. |
| 2018/0376198 A1 | 12/2018 | Sheppard et al. |
| 2019/0147461 A1 | 5/2019 | Sheppard et al. |
| 2019/0289363 A1 | 9/2019 | Nagaraja Rao et al. |
| 2019/0289863 A1 | 9/2019 | Bruggeman |
| 2019/0354574 A1 | 11/2019 | Wick et al. |
| 2019/0356950 A1 | 11/2019 | Sheppard et al. |
| 2019/0370860 A1 | 12/2019 | Morovati Lopez et al. |
| 2020/0120387 A1 | 4/2020 | Sheppard et al. |
| 2020/0175546 A1 | 6/2020 | Perez et al. |
| 2020/0204863 A1 | 6/2020 | Sullivan et al. |
| 2020/0294069 A1 | 9/2020 | Sheppard et al. |
| 2020/0296441 A1 | 9/2020 | Sheppard et al. |
| 2020/0359090 A1 | 11/2020 | Sheppard et al. |
| 2021/0014564 A1 | 1/2021 | Sheppard et al. |
| 2021/0058659 A1 | 2/2021 | Sheppard et al. |
| 2021/0065230 A1 | 3/2021 | Flynn |
| 2021/0133773 A1 | 5/2021 | Sheppard et al. |
| 2021/0158377 A1 | 5/2021 | Sheppard et al. |
| 2021/0319002 A1 | 10/2021 | Ryan et al. |
| 2021/0319474 A1 | 10/2021 | Sheppard et al. |
| 2021/0400341 A1 | 12/2021 | Sheppard et al. |
| 2022/0038781 A1 | 2/2022 | Sullivan et al. |
| 2022/0056667 A1 | 2/2022 | Saitoh et al. |
| 2022/0058667 A1 | 2/2022 | Sheppard et al. |
| 2022/0058688 A1 | 2/2022 | Sheppard et al. |

(56) References Cited

U.S. PATENT DOCUMENTS

| | | | |
|---|---|---|---|
| 2022/0122104 A1 | 4/2022 | Sheppard et al. |
| 2022/0159326 A1 | 5/2022 | Sheppard et al. |
| 2022/0264179 A1 | 8/2022 | Sheppard et al. |
| 2022/0264187 A1 | 8/2022 | Sheppard et al. |
| 2022/0408154 A1 | 12/2022 | Sheppard et al. |
| 2023/0042879 A1 | 2/2023 | Sheppard et al. |
| 2023/0070980 A1 | 3/2023 | Sullivan et al. |
| 2023/0111617 A1 | 4/2023 | Sheppard et al. |

FOREIGN PATENT DOCUMENTS

| | | |
|---|---|---|
| KR | 20160087263 A | 7/2016 |
| WO | 2008127737 A1 | 10/2008 |
| WO | 2014210597 A1 | 12/2014 |

OTHER PUBLICATIONS

Phillip S. Kott, "An Introduction to Calibration Weighting for Establishment Surveys," 2012, accessed from <https://ww2.amstat.org/meetings/ices/2012/papers/302286.pdf>, 12 pages.

United States Patent and Trademark Office, "Non-Final Office action", issued in connection with U.S. Appl. No. 15/635,153, dated Feb. 5, 2018, 8 pages.

United States Patent and Trademark Office, "Non-Final Office action", issued in connection with U.S. Appl. No. 15/445,543, dated Jan. 11, 2018, 19 pages.

United States Patent and Trademark Office, "Non-Final Office Action", issued in connection with U.S. Appl. No. 15/445,543, dated Jan. 8, 2019, 15 pages.

United States Patent and Trademark Office, "Non-Final Office Action", issued in connection with U.S. Appl. No. 15/445,557, dated Jun. 29, 2018, 11 pages.

United States Patent and Trademark Office, "Non-Final Office Action", issued in connection with U.S. Appl. No. 15/619,257, dated Jun. 15, 2018, 15 pages.

United States Patent and Trademark Office, "Non-Final Office Action", issued in connection with U.S. Appl. No. 16/355,386, dated Nov. 9, 2020, 8 pages.

United States Patent and Trademark Office, "Non-Final Office Action", issued in connection with U.S. Appl. No. 16/526,747, dated Jul. 23, 2020, 7 pages.

United States Patent and Trademark Office, "Non-Final Office Action", issued in connection with U.S. Appl. No. 16/657,652, dated Oct. 18, 2021, 22 pages.

United States Patent and Trademark Office, "Non-Final Office Action", issued in connection with U.S. Appl. No. 16/657,652, dated Oct. 27, 2020, 18 pages.

United States Patent and Trademark Office, "Non-Final Office Action", issued in connection with U.S. Appl. No. 16/676,158, dated Mar. 18, 2022, 29 pages.

United States Patent and Trademark Office, "Non-Final Office Action", issued in connection with U.S. Appl. No. 16/676,158, dated Nov. 29, 2021, 24 pages.

United States Patent and Trademark Office, "Non-Final Rejection", issued in connection with U.S. Appl. No. 17/902,612, dated Jan. 6, 2023, 5 pages.

Bourguignon et al., "On the Construction of Synthetic Panels", Oct. 2015, 42 pages.

Charles L. Byrne, "Applied Iterative Methods", Jan. 23, 2007, 396 pages.

Charles L. Byrne, "Iterative Algorithms in Inverse Problems", Apr. 25, 2006, 347 pages.

Esch et al., "Appendix 8 Numerical Methods for Solving Nonlinear Equations", Asset and Risk Management: Risk Oriented Finance, published 2005 by John Wiley & Sons Ltd., 7 pages.

Golub et al., "Linear Least Squares and Quadratic Programming", Technical Report No. CS 134, Stanford University, Computer Science Department, May 1969, 38 pages.

Haggin, Patience et al., "Google Nears a Long-Tipped Limit on Tracking "Cookies", in Blow to Rivals", The Wall Street Journal, May 6, 2019, obtained from https://www.wsj.com/articles/googles-new-privacy-tools-to-make-cookies-crumble-competitors-stumble-11557151913, 3 pages.

Huckett et al., "Combining Methods to Create Synthetic Microdata: Quantile Regression, Hot Deck, and Rank Swapping", Research Gate, Apr. 2008, 11 pages.

United States Patent and Trademark Office, "Non-Final Office Action", issued in connection with U.S. Appl. No. 16/843,650, dated Jul. 29, 2022, 36 Pages.

International Bureau, "International Preliminary Report", issued in connection with International Application No. PCT/US2021/026010, dated Oct. 6, 2022, 7 pages.

"International Preliminary Report on Patentability", received in PCT Application No. PCT/US2022/015516, dated Aug. 3, 2023, 5 pages.

International Searching Authority, "International Preliminary Report on Patentability", issued in connection with application No. PCT/US2020/022436 dated Sep. 16, 2021, 5 pages.

International Searching Authority, "International Preliminary Report on Patentability", issued in connection with application No. PCT/US2020/022438 dated Sep. 16, 2021, 6 pages.

International Searching Authority, "International Search Report & Written issued Opinion", in connection with application No. PCT/US21/26010, dated Jul. 26, 2021, 8 pages.

International Searching Authority, "International Search Report & Written Opinion", in connection with application No. PCT/US2020/022436 dated Jul. 6, 2020, 9 pages.

United States Patent and Trademark Office, "Non-Final Office", action issued in connection with U.S. Appl. No. 15/445,530, dated Apr. 11, 2018, 9 pages.

International Searching Authority, "International Search Report & Written Opinion", issued in connection with application No. PCT/US2020/022438 dated Jul. 6, 2020, 10 pages.

Marno Verbeek, "Pseudo-Panels and Repeated Cross-Sections", The Econometrics of Panel Data, Springer-Verlag Berlin Heidelberg 2008, 15 pages.

P.J.G. Teunissen, "Least-Squares Estimation of the Integer GPS Ambiguities", Delft University of Technology, Department of the Geodetic Engineering, Aug. 1993, 16 pages.

United States Patent and Trademark Office, "Advisory Action", issued in connection with U.S. Appl. No. 16/676,158, dated Oct. 6, 2022, 3 pages.

United States Patent and Trademark Office, "Non-Final Office Action", issued in connection with U.S. Appl. No. 17/408,208, dated May 10, 2023, 9 Pages.

United States Patent and Trademark Office, "Final Rejection", issued in connection with U.S. Appl. No. 17/408,208, dated Dec. 8, 2022, 10 pages.

United States Patent and Trademark Office, "Non-Final Rejection", issued in connection with U.S. Appl. No. 16/843,650, dated Dec. 2, 2022, 43 pages.

United States Patent and Trademark Office, "Non-Final Rejection", issued in connection with U.S. Appl. No. 17/408,208, dated Aug. 15, 2022, 24 pages.

United States Patent and Trademark Office, "Non-Final Rejection", issued in connection with U.S. Appl. No. 17/465,567, dated Nov. 16, 2022, 12 pages.

United States Patent and Trademark Office, "Non-Final Rejection", issued in connection with U.S. Appl. No. 17/567,710, dated Oct. 14, 2022, 8 pages.

United States Patent and Trademark Office, "Non-Final Rejection", issued in connection with U.S. Appl. No. 17/734,792, dated Oct. 13, 2022, 6 pages.

United States Patent and Trademark Office, "Non-Final Office Action", issued in connection with U.S. Appl. No. 17/408,164, dated Mar. 29, 2023, 14 pages.

United States Patent and Trademark Office, "Non-Final Office Action", issued in connection with U.S. Appl. No. 17/666,359, dated Nov. 18, 2022, 9 pages.

(56) References Cited

OTHER PUBLICATIONS

United States Patent and Trademark Office, "Advisory Action", issued in connection with U.S. Appl. No. 16/657,652, dated Aug. 19, 2021, 4 pages.

United States Patent and Trademark Office, "Advisory Action", issued in connection with U.S. Appl. No. 17/408,208, dated Mar. 3, 2023, 3 pages.

United States Patent and Trademark Office, "Non-Final Office Action", issued in connection with U.S. Appl. No. 17/666,359, dated Aug. 18, 2022, 8 pages.

United States Patent and Trademark Office, "Non-Final Office Action", issued in connection with U.S. Appl. No. 17/408,208, dated Jan. 5, 2022, 21 pages.

United States Patent and Trademark Office, "Non-Final Office Action", issued in connection with U.S. Appl. No. 17/099,510, dated Mar. 29, 2022, 6 pages.

United States Patent and Trademark Office, "Non-Final Office Action", issued in connection with U.S. Appl. No. 17/093,460, dated Oct. 22, 2021, 5 pages.

United States Patent and Trademark Office, "Non-Final Office Action", issued in connection with U.S. Appl. No. 16/939,996, dated Jun. 24, 2021, 15 pages.

United States Patent and Trademark Office, "Non-Final Office Action", issued in connection with U.S. Appl. No. 16/893,129, dated Apr. 13, 2021, 8 pages.

United States Patent and Trademark Office, "Non-Final Office Action", issued in connection with U.S. Appl. No. 16/843,650, dated May 26, 2021, 26 pages.

United States Patent and Trademark Office, "Final Office Action", issued in connection with U.S. Appl. No. 15/445,543, dated Aug. 3, 2018, 16 pages.

United States Patent and Trademark Office, "Final Office Action", issued in connection with U.S. Appl. No. 15/445,543, dated Jul. 18, 2019, 12 pages.

United States Patent and Trademark Office, "Final Office Action", issued in connection with U.S. Appl. No. 15/445,557, dated Dec. 27, 2018, 9 pages.

United States Patent and Trademark Office, "Final Office Action", issued in connection with U.S. Appl. No. 15/619,257, dated Jan. 18, 2019, 18 pages.

United States Patent and Trademark Office, "Final Office Action", issued in connection with U.S. Appl. No. 16/355,386, dated May 4, 2021, 10 pages.

United States Patent and Trademark Office, "Final Office Action", issued in connection with U.S. Appl. No. 16/526,747, dated Dec. 30, 2020, 8 pages.

United States Patent and Trademark Office, "Final Office Action", issued in connection with U.S. Appl. No. 16/657,652, dated May 14, 2021, 19 pages.

United States Patent and Trademark Office, "Final Office Action", issued in connection with U.S. Appl. No. 16/676,158, dated Jul. 29, 2022, 30 pages.

United States Patent and Trademark Office, "Final Office Action", issued in connection with U.S. Appl. No. 16/843,650, dated Dec. 17, 2021, 33 pages.

United States Patent and Trademark Office, "Final Office Action", issued in connection with U.S. Appl. No. 16/939,996, dated Dec. 16, 2021, 19 pages.

United States Patent and Trademark Office, "Final Office Action", issued in connection with U.S. Appl. No. 17/408,208, dated Apr. 20, 2022, 26 pages.

United States Patent and Trademark Office, "Final Office Action", issued in connection with U.S. Appl. No. 16/843,650, dated Apr. 10, 2023, 40 pages.

* cited by examiner

METHODS AND APPARATUS TO ESTIMATE POPULATION REACH FROM MARGINALS

RELATED APPLICATION

This patent claims the benefit of U.S. Provisional Application No. 63/077,418, filed on Sep. 11, 2020. U.S. Provisional Application No. 63/077,418 is hereby incorporated herein by reference in its entirety. Priority to U.S. Provisional Application No. 63/077,418 is hereby claimed.

FIELD OF THE DISCLOSURE

This disclosure relates generally to media audience measurement and, more particularly, to methods and apparatus to estimate population reach from marginals.

BACKGROUND

Determining a size and demographics of an audience of a media presentation helps media providers and distributors schedule programming and determine a price for advertising presented during the programming. In addition, accurate estimates of audience demographics enable advertisers to target advertisements to certain types and sizes of audiences. To collect these demographics, an audience measurement entity enlists a group of media consumers (often called panelists) to cooperate in an audience measurement study (often called a panel). In some examples, the audience measurement entity obtains (e.g., directly, or indirectly from a media service provider) return path data from media presentation devices (e.g., set-top boxes) that identifies tuning data from the media presentation devices. In such examples, because the return path data may not be associated with a known panelist, the audience measurement entity models and/or assigns viewers to represent the return path data. In some examples, the media consumption habits and demographic data associated with the enlisted media consumers are collected and used to statistically determine the size and demographics of the entire audience of the media presentation. In some examples, this collected data (e.g., data collected via measurement devices) may be supplemented with survey information, for example, recorded manually by the presentation audience members.

Figure 1:
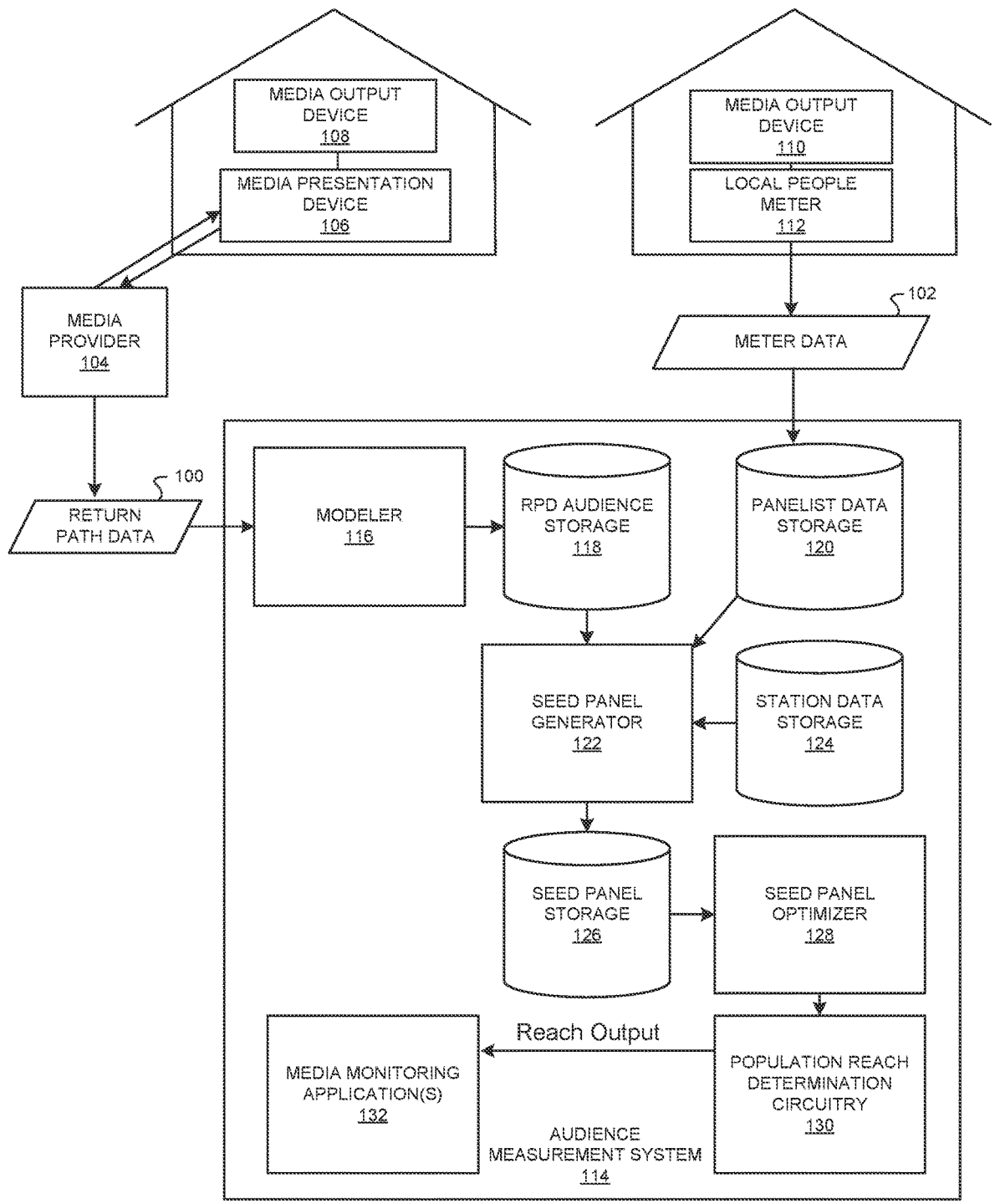
FIG. 1 is a block diagram of an example environment in which return path data and meter data are collected from media presentation locations and are analyzed by an example audience measurement system to estimate media reach for a population based on audience marginal ratings data.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Audience measurement entities seek to understand the composition and size of audiences of media, such as television programming. Such information allows audience measurement entity researchers to, for example, report advertising delivery and/or targeting statistics to advertisers that target their media (e.g., advertisements) to particular audiences. Also, such information helps to establish advertising prices commensurate with audience exposure and demographic makeup (referred to herein collectively as "audience configuration"). One way to gather media presentation information is to gather the media presentation information from media output devices (e.g., gathering television presentation data from a set-top box (STB) connected to a television). As used herein, media presentation includes media output by a media device regardless of whether or not an audience member is present (e.g., media output by a media output device at which no audience is present, media exposure to an audience member(s), etc.).

A media presentation device (e.g., STB) provided by a service provider (e.g., a cable television service provider, a satellite television service provider, an over the top service provider, a music service provider, a movie service provider, a streaming media provider, etc.) or purchased by a consumer may contain processing capabilities to monitor, store, and transmit tuning data (e.g., which television channels are tuned by the media presentation device at a particular time) back to the service provider, which can then aggregate and provide such return path data to an audience measurement entity (e.g., The Nielsen Company (US), LLC.) to analyze media presentation activity. Data transmitted from a media presentation device back to the service provider is referred to herein as return path data. Return path data includes tuning data. Tuning data is based on data received from the media presentation device while the media presentation device is on (e.g., powered on, switched on, and/or tuned to a media channel, streaming, etc.). Although return path data includes tuning data, return path data may not include data related to the user viewing the media corresponding to the media presentation device. Accordingly, return path data may not be able to be associated with specific viewers, demographics, locations, etc.

To determine aspects of media presentation data (e.g., which household member is currently consuming a particular media and the demographics of that household member), market researchers may perform audience measurement by enlisting a subset of the media consumers as panelists. Panelists or monitored panelists are audience members (e.g., household members, users, panelists, etc.) enlisted to be monitored, who divulge and/or otherwise share their media activity and/or demographic data to facilitate a market research study. An audience measurement entity typically monitors media presentation activity (e.g., viewing, listening, etc.) of the monitored panelists via audience measurement system(s), which include metering device(s), such as a local people meter (LPM). Audience measurement typically includes determining the identity of the media being presented on a media output device (e.g., a television, a radio, a computer, etc.), determining data related to the media (e.g., presentation duration data, timestamps, channel data, etc.), determining demographic information of an audience, and/or determining which members of a household are associated with (e.g., have been exposed to) a media presentation. For example, an LPM in communication with an audience measurement entity communicates audience measurement (e.g., metering) data to the audience measurement entity. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In some examples, metering data (e.g., including media presentation data) collected by an LPM or other meter is stored in a memory and transmitted via a network, such as the Internet, to a datastore managed by the audience measurement entity. Typically, such metering data is combined with additional metering data collected from a group of LPMs monitoring a group of panelist households. The metering data may include, but are not limited to, a number of minutes a household media presentation device was tuned to a particular channel, a number of minutes a household media presentation device was used (e.g., consumed) by a household panelist member and/or a visitor (e.g., a presentation session), demographics of the audience (which may be statistically projected based on the panelist data), information indicative of when the media presentation device is on or off, and/or information indicative of interactions with the media presentation device (e.g., channel changes, station changes, volume changes, etc.), etc. As used herein, a channel may be a tuned frequency, selected stream, an address for media (e.g., a network address), and/or any other identifier for a source and/or carrier of media.

In some examples, the audience measurement entity processes the collected and/or aggregated metering data for markets where a panel is maintained and obtains (e.g., from one or more service provider) return path data for markets where a panel is not maintained to generate a seed panel. A seed panel is a synthetic panel including monitored panelists and non-panelist selected to correspond to return path data homes (e.g., in-market return path data) and regional panel homes (e.g., over the air only panelists) and used as the basis for generation of synthetic respondent level data (e.g., representative of a group synthetic/virtual panelists) based on a similarity to the segment of the market that is not covered by return path data. These monitored panelists are selected from a panel (e.g., a national panel of metered users) based on a regional proximity to a designated market area, a similarity between demographics of the monitored panelists and demographics of the return path data audience location, household media characteristics (e.g., how the households receive television signals (cable, satellite, over-the-air radio, etc.)), a similarity between media consumption of the monitored panelists and the return path data audience, etc. As used herein, a return path data audience is represented by audience (e.g., viewer or listener) assigned return path data associated with a population (e.g., a universe or users) and/or location. As used herein, a seed panelist is a monitored panelist that has been selected to be included in a seed panel. As used herein, synthetic respondent level data or respondent level data is processed viewing data at the level of individual respondents. Synthetic respondent level data may include complete synthesized time records (e.g., at the quarter hour level, hour level, etc.) across each broadcasting day of all viewing session by individual family member and guest on individual metered media output devices in a home, and include the demographic data. As used herein, designated market area is a geographical area that defines a media market where synthetic respondent level data is produced.

In some examples, the audience measurement entity adjusts the seed panel to satisfy target ratings and/or target reach. As used herein, a rating is an average percentage of a population exposed to media across a given time interval. As used herein, reach is a cumulative percentage or total of a population that has been counted as a viewer of the media at least once during a given time interval (e.g., hourly, daily, weekly, monthly, etc.). As used herein, a de-duplicated audience value refers to the number of unique people in an audience (without double counting any person). De-duplicated audience value may also be referred to as unique audience, de-duplicated total audience value, de-duplicated audience, or audience. As used herein, a universe estimate refers to a total population size of users that potentially could be exposed to the media. In some examples, reach can be calculated as a de-duplicated audience value normalized to a universe estimate. Ratings and reach values may be determined for a same time interval or respective different time intervals. Examples disclosed herein adjust the seed panel by adjusting weights of seed panelists corresponding to the target rating and/or reach until the target rating and/or reach is satisfied. For example, if the target rating is 25% of men exposed to a first program during a first duration of time and 30% of the generated seed panel men were exposed to the first program during the first duration of time, the audience measurement entity may adjust the seed panel to reduce the current rating (e.g., 30%) for that demographic, to a rating closer to the target rating (e.g., 25%). The audience measurement entity may use the adjusted seed panel to generate media exposure data based on marginal data (e.g., quarter hours, hours, days, etc.). Such media exposure data may include a total number of seed panelists exposed to the media at the different margins, a total population of audience members exposed to the media at the different margins, a total number of de-duplicated seed panelists exposed to the media (e.g., an audience reach) from all of the different marginal rating (e.g., probabilities), and a total population size (e.g., universe estimate) of users that potentially could be exposed to the media. As used herein, a marginal rating corresponds to a probability that a person in the universe of people was exposed to media for a particular duration of time. As used herein, a recorded audience refers to monitored panelists exposed to media and a population audience represent the total population of people (e.g., monitored panelists and other unmonitored media consumers associated with return path data) exposed to the media. Although examples disclosed herein are described in conjunction with marginal data from a seed panel, examples disclosed herein may be utilized to determine population data based on any type of recorded data.

Examples disclosed herein receive marginal audience exposure data for different instances of media exposure (e.g., different episodes of a television series, different quarter hour time slots of a television program, or a radio program, etc.) and estimate a population reach (e.g., a de-duplicated audience value normalized to a universe estimate of the population audience) across the different instances of media exposure based on the marginal media exposure data. Traditional techniques of determining the total population based on marginal media ratings include numerical calculations that enumerate the marginal rating data for all combinations in which someone can watch a program. The number of probabilities to be solved by such traditional techniques is $2^n$ number of probabilities, where n is the number of marginal probabilities provided in the marginal ratings data (e.g., the ratings for the different possible instances of media exposure). For example, if reach is to be calculated across 4 quarter hour intervals (e.g., for an hour-long media exposure), which corresponds to four possible marginal ratings, the total number of probabilities to be solved using such a traditional technique is 16 (e.g., $2^4$). If the reach is to be calculated across 96 quarter hour intervals (e.g., a day-long media exposure), the total number of probabilities to be solved using such a traditional technique is $8*10^{28}$ (e.g., $2^{96}$) thereby exceeding the memory limit and/or processing power of any existing computer. Examples disclosed herein alleviate such memory/processing resource problems associated with such a traditional technique by calculating the solution using a disclosed analytical process.

To estimate the total population reach (e.g., the de-duplicated audience value normalized to the universe estimate of the population audience), examples disclosed herein determine pseudo universe estimate(s) (e.g., a pseudo universe estimate of the monitored (also referred to as the recorded) audience and a pseudo universe estimate of the return path data (also referred to as the population) audience). A pseudo universe estimate corresponds to what the size of the universe of individuals capable of being in a given audience would need to be to achieve the ratings and reach values for that audience if the different marginal ratings are assumed to be independent, regardless of how much dependency actually exists among the different audience marginal ratings. For example, when the universe of a recorded audience is equal to the pseudo universe value, then the total reach of the recorded audience can be calculated from the audience marginal ratings assuming the audience marginal ratings are independent. However, if there is a difference between the pseudo universe of the recorded audience and the actual universe of the recorded audience, the audience marginal ratings are dependent. Examples disclosed herein (A) access marginal ratings (e.g., audience exposure values) for the recorded audience, marginal ratings (e.g., audience exposure values) for the population audience, reach (e.g., de-duplicated audience value normalized to a universe estimate) for the recorded audience, and total population size (e.g., the actual universe estimate) and (B) determine pseudo universe estimates to solve a system of equations resulting in the population audience reach (e.g., the de-duplicated audience value for the population normalized to the population size). The system of equations includes a link tool (e.g., a link equation), which is based on the pseudo universe estimates to link that dependency of the population audience marginal ratings to the dependencies exhibited by recorded audience marginal ratings. In this manner, examples disclosed herein determine the population audience reach (e.g., the de-duplicated audience value for the population normalized to the population size) from the marginal ratings, in a manner that takes into account the dependency among the different marginal ratings. In some examples, marginal ratings are also referred to as audience exposure values.

Examples disclosed herein use the below system of Equations (e.g., Equations 1a-3a), to determine the total population reach.

$$1 - \frac{A_d}{Q_R} = \prod_{i=1}^{N}\left(1 - \frac{A_i}{Q_R}\right) \quad \text{(Equation 1a)}$$

$$\frac{Q_R - A_d}{UE - A_d} = \frac{Q_P - X_d}{UE - X_d} \quad \text{(Equation 2a)}$$

$$1 - \frac{X_d}{Q_P} = \prod_{i=1}^{N}\left(1 - \frac{X_i}{Q_P}\right) \quad \text{(Equation 3a)}$$

In the preceding equations, UE is the actual universe estimate (e.g., the total population size), $A_d$ is the total recorded audience reach, $Q_R$ is the pseudo universe estimate of the recorded audience, N is the number of marginals, $A_i$ is the recorded audience marginal rating for the ith marginal, $X_d$ is the total population reach, $Q_P$ is the pseudo universe estimate of the population audience, and $X_i$ is the population marginal rating for the ith marginal. The pseudo universe estimates of the recorded audience and the population audience of Equations 1a and 3a represent the sizes of the respective recorded and population audiences would need to be for the respective marginal rating to yield to corresponding reach value if there was independence between the different marginal ratings. Equation 2a is the link between the independency assumption and the actual dependency exhibited by the recorded population. In the above Equations 1a-3a, Equation 1a defines the relationship between the recorded audience reach and the recorded audience marginal ratings assuming independence of the marginal ratings and the total population size is the pseudo universe for the recorded audience, Equation 3a defines relationship between the population audience reach and the population audience marginal ratings assuming independence of the marginal ratings and the total population size is the pseudo universe for the population audience, and Equation 2a is the link tool linking the independence associated with Equations 1a and 3a with the actual dependence of the marginal ratings.

Additionally or alternatively, Equations 1a-3a may be normalized across the universe estimate (UE), where each variable is a percentage of the actual universe estimate (UE), as shown in the below system of Equations (e.g., Equations 1b-3b).

$$1 - \frac{A_d}{Q_R} = \prod_{i=1}^{N}\left(1 - \frac{A_i}{Q_R}\right) \quad \text{(Equation 1b)}$$

$$\frac{Q_R - A_d}{1 - A_d} = \frac{Q_P - X_d}{1 - X_d} \quad \text{(Equation 2b)}$$

$$1 - \frac{X_d}{Q_P} = \prod_{i=1}^{N}\left(1 - \frac{X_i}{Q_P}\right) \quad \text{(Equation 3b)}$$

In some examples disclosed herein, the above system of equations may be solved using a root-finding algorithm which may require a nonlinear root finding system. Alternatively, the above system of equations may be adjusted to determine the total population reach without the need of a root-finding algorithm. For example, solving Equation 1a for $Q_R$ results in Equation 4.

$$Q_R = \frac{A_d}{1 - \prod_{i=1}^{N}\left(1 - \frac{A_i}{Q_R}\right)} \quad \text{(Equation 4)}$$

In Equation 4, $Q_R$ is a recursive function of itself, which can be solved iteratively for the subsequent pseudo estimate, as shown in Equation 5.

$$Q_R^{k+1} = \frac{A_d}{1 - \prod_{i=1}^{N}\left(1 - \frac{A_i}{Q_R^k}\right)} \quad \text{(Equation 5)}$$

At a given iteration, because $Q_R^k$ is known, examples disclosed herein can solve $Q_P^k$ using Equation 2a and rephrase Equation 3a to solve for $X_d$. Accordingly, Equations 1a-3a may be rephrased and solved iteratively using the Equations 6-8 below, thereby eliminating the need to using a root-finding algorithm.

$$Q_P^k = X_d^k + (UE - X_d^k)\left(\frac{Q_R^k - A_d}{UE - A_d}\right) \quad \text{(Equation 6)}$$

$$X_d^{k+1} = Q_P^k\left(1 - \prod_{i=1}^{N}\left(1 - \frac{X_i}{Q_P^k}\right)\right) \quad \text{(Equation 7)}$$

$$Q_R^{k+1} = \frac{A_d}{1 - \prod_{i=1}^{N}\left(1 - \frac{A_i}{Q_R^k}\right)} \quad \text{(Equation 9)}$$

In the preceding equations, Equation 6 defines the pseudo universe estimate of the population and is the link tool linking the independence assumption of Equations 7 and 8 with the actual dependencies exhibited by the marginal ratings, and Equation 8 defines the pseudo universe estimate of the recorded audience. In some examples, Equations 1b-3b may be rephrased resulting in a system of equations similar to Equations 6-8, but that is normalized across the UE. Examples disclosed herein let $Q_R$ be the solution to Equation 1a and define a panel representation value (r) using the below Equation 9.

$$r = \frac{Q_R - A_d}{1 - A_d} \quad \text{(Equation 9)}$$

Examples disclosed herein further define the system of equations to solve the census using the below Equation 10 and the above Equation 3b.

$$r = \frac{Q_P - X_d}{1 - X_d} \quad \text{(Equation 10)}$$

In some examples, the panel representation value (r) is a sufficient statistic which can be used to estimate the total population reach ($X_d$). However, the panel representation value (r) can be transformed into a panelist correlation value (r*) using the below Equation 11. The panelist correlation value (r*) has a value between −1 and 1 wherein a value of −1 represents a complete disjoint set of audience, a value of 0 represents audience independents, and a value of 1 represents complete overlap set of audience.

$$r^* = \frac{1 - r}{1 + r} \quad \text{(Equation 11)}$$

In operation, examples disclosed herein initialize the pseudo universe estimate for the recorded audience as 1 (e.g., $Q_R^0=1$) and iteratively solves the above Equation 8 until the value of $Q_R$ converges on a solution (e.g., the difference between the value of $Q_R$ at any iteration is less than a threshold distance from the value of $Q_R$ at a subsequent iteration). Once $Q_R$ is determined, examples disclosed herein determine the panel representation value using the above Equation 9. Examples disclosed herein determine the panelist correlation value using the above Equation 11. Examples disclosed herein store an audience relationship value for use in the current and subsequent reach determinations, thereby eliminating the need to recalculate panel parameters for subsequent reach determinations. In some examples, the audience relationship value can be either the panel representation value or the panelist correlation value. In this manner, processing and memory resources are conserved because the recalculation of the audience relationship value is not needed. Although the audience relationship value may be used for the same or different media (e.g., different episodes of the same show, episodes of different shows, and/or the same episode of the same show for a different audience (e.g., live vs. streaming)) from the same or different media providers, the audience relationship value may be more accurate for similar types of media (e.g., media with similar audiences).

Examples disclosed herein define logical bounds of the population reach $X_d$ using the below Equation 12.

$$\max(X_i) \leq X_d \leq \min(1, \Sigma_{i=1}^n X_i) \quad \text{(Equation 12)}$$

The left-hand side of Equation 12 represents a lower bound of the total population audience ($X_d$) and the right-hand side of Equation 12 represents an upper bound of the total population audience ($X_d$). In some examples, the total population audience ($X_d$) must be more than any individual marginal audience as the marginal audience is a subset of the total audience. Thus, the lower bound of the total population audience ($X_d$) is the maximum of the population marginal ratings ($X_i$) as represented in the left-hand side of Equation 12. In an example extreme case, all marginal audiences are disjoint with no interaction between the marginal audiences. Thus, in the example extreme case, the upper bound of $X_d$ is the sum of all marginal audiences. Additionally, in some examples, $X_d$ cannot exceed 100% which is the theoretical maximum under such circumstances. Therefore, in some examples, the upper bound of the total population audience ($X_d$) is the minimum of the sum of all marginal audiences and 1 as represented by the right-hand side of Equation 12.

Examples disclosed herein determine logical bounds for the pseudo universe estimate of the population audience ($Q_P$). Solving Equation 10 for $Q_P$ yields Equation 13 below. First intermediate bounds, [$a_1$, $b_1$], can be found from Equation 13 based on the logical bounds of $X_d$ from Equation 12 and the panel representation value (r) known from Equation 9. Second intermediate bounds, [$a_2$, $b_2$], can be found by applying the logical bounds of $X_d$ from Equation 12 to Equation 3b. Final bounds for $Q_P$, [a, b], are defined as a set intersection of the first intermediate bounds, [$a_1$, $b_1$], and the second intermediate bounds, [$a_2$, $b_2$].

$$Q_P = r + (1-r)X_d \quad \text{(Equation 13)}$$

Examples herein define the following variables M, S, and $S^+$ based on the below Equations 14, 15 and 16 wherein M is a maximum marginal rating of the population audience, S is a sum of the marginal ratings of the population audience and $S^+$ is the minimum of 1 or the sum of the marginal ratings, S.

$$M = \max(X_i) \quad \text{(Equation 14)}$$

$$S = \Sigma_{i=1}^n X_i \quad \text{(Equation 15)}$$

$$S^+ = \min(1, S) \quad \text{(Equation 16)}$$

The first intermediate bounds, [$a_1$, $b_1$], depend the value of the panel representation value (r). If the panel representation value (r) is greater than or equal to zero and less than or equal to one, a first intermediate lower bound ($a_1$) and a first intermediate upper bound ($b_1$) are defined using below Equations 17 and 18.

$$a_1 = r + (1-r)M \quad \text{(Equation 17)}$$

$$b_1 = r + (1-r)S^+ \quad \text{(Equation 18)}$$

If the panel representation value (r) is greater than one, the first intermediate lower bound ($a_1$) and the first intermediate upper bound ($b_1$) are defined using below Equations 19 and 20.

$$a_1 = r + (1-r)S^+ \quad \text{(Equation 19)}$$

$$a_1 = r + (1-r)M \quad \text{(Equation 20)}$$

The second intermediate bounds, [$a_2$, $b_2$], are found in examples disclosed herein using Equations 3b and 12. A second intermediate lower bound ($a_2$) can be found by solving Equation 3b for $Q_P$ and setting the total population audience ($X_d$) to its minimum value as defined in Equation 12. For example, the total population audience ($X_d$) is set to the maximum marginal rating of the population audience (M) and $Q_P$ is found to equal the maximum marginal rating of the population audience (M). Therefore, the second intermediate lower bound ($a_2$) is equal to M.

A second intermediate upper bound ($b_2$) depends on the value of the sum of the marginal ratings of the population audience (S). If the sum of the marginal ratings of the population audience (S) is greater than or equal to zero and less than or equal to one, this represents an extreme case wherein the marginal audiences are disjoint with no interaction between the marginal audiences. Thus, $Q_P$ is unbounded and the second intermediate upper bound ($b_2$) is equal to infinity. However, if the sum of the marginal ratings of the population audience (S) is greater than one, there is guaranteed some overlap between the marginal audiences and the second intermediate upper bound ($b_2$) is defined by a finite upper bound (c). The finite upper bound (c) can be determined using fixed-point iteration on below Equations 21 and 22 by initializing the finite upper bound (c) to one and iterating until convergence.

$$c^{(k+1)} \leftarrow \frac{1}{1-P} \quad \text{(Equation 21)}$$

$$P = \prod_{i=1}^N \left(1 - \frac{X_i}{c}\right) \quad \text{(Equation 22)}$$

To determine the final bounds, the set intersection of the first intermediate bounds and the second intermediate bounds is performed. For example, $Q_P$ is bound between a final lower bound (a) and a final upper bound (b) wherein the final lower bound (a) and the final upper bound (b) are defined by Equations 23 and 24 below.

$$a = \max\{a_1, a_2\} \quad \text{(Equation 23)}$$

$$b = \min\{b_1, b_2\} \quad \text{(Equation 24)}$$

After finding the final bounds of $Q_P$, $Q_P$ can be solved for within the final bounds using below Equations 25-27 and a root finding algorithm. For example, $Q_P$ can be initialized at a value between the lower final bound (a) and the final upper bound (b). The initial value of $Q_P$ can be applied to Equation 25 to solve for the intermediate product (P). The value of the intermediate product (P) can be applied to Equation 26 to find a value for total population audience ($X_d$). Finally, the initial value of $Q_P$ and the value for the total population audience ($X_d$) can be applied to Equation 27 to check if Equation 27 is satisfied as a root. If Equation 27 is not satisfied as a root, the value of $Q_P$ can be iterated within the bounds and the root can be checked again until a root value is found.

$$P = \prod_{i=1}^{N} \left(1 - \frac{X_i}{Q_P}\right) \quad \text{(Equation 25)}$$

$$X_d = (1-P)Q_P \quad \text{(Equation 26)}$$

$$(Q_P - X_d) - (1 - X_d)r = 0 \quad \text{(Equation 27)}$$

FIG. 1 is a block diagram of an environment in which example return path data 100 and example meter data 102 are collected to determine reach based on a marginal ratings data. FIG. 1 includes the example return path data 100, the example meter data 102, an example media provider 104, an example media presentation device 106, example media output devices 108, 110, an example local people meter (LPM) 112, and an example audience measurement system 114 managed by an example audience measurement entity (AME). The example audience measurement system 114 includes an example modeler 116, an example return path data (RPD) audience storage 118, an example panelist data storage 120, an example seed panel generator 122, an example station data storage 124, an example seed panel storage 126, an example seed panel optimizer 128, and an example population reach determination circuitry 130.

The example media provider 104 of FIG. 1 is a service provider (e.g., cable media service provider, a radio frequency (RF) media provider, a satellite media service provider, etc.) that presents media to an audience member via the example media presentation device 106. The media provided by the example media provider 104 is transmitted (e.g., via a wired or wireless network connection) to the media presentation device 106. The media presentation device 106 is connected, via a wired or wireless connection, to the example media output device 108 to output the media to an audience member. The media output device 108 is a device capable of outputting the received media. For example, the media output device 108 may be a television, a radio, speakers, a projector, a computer, a computing device, a tablet, a mobile device, and/or any other device capable of outputting media.

When the example media presentation device 106 of FIG. 1 is on, the media presentation device 106 receives media corresponding to a station, program, website, etc., based on the tuning of the example media presentation device 106. For example, the media presentation device 106 may be a set-top box. Additionally or alternatively, the example media presentation device 106 may be an over the top device, a video game console, a digital video recorder (DVR), a digital versatile disc (DVD) player, a receiver, a router, a server, a computer, a mobile device, and/or any device that receives media from a service provider. In some examples, the media presentation device 106 may implement a DVR and/or DVD player. In some examples, the example media presentation device 106 includes a unique device identifier (e.g., such as a unique serial number, a unique network address, etc.) that, when associated with subscriber information, allows an audience measurement entity, a marketing entity, and/or any other entity to ascertain specific subscriber behavior information.

By way of example, the example media presentation device 106 may be tuned to channel 5. In such an example, the media presentation device 106 outputs media (from the example media provider 104) corresponding to the tuned channel 5. The media presentation device 106 may gather tuning data corresponding to which channels, stations, websites, etc., that the example media presentation device 106 was tuned. The example media presentation device 106 generates and transmits the example return path data 100 to the example media provider 104. The example return path data 100 includes the tuning data and/or data corresponding to the example media provider 104. Although the illustrated example of FIG. 1 includes the example media provider 104 receiving the example return path data 100 from one media presentation device (e.g., the example media presentation device 106), at one location, corresponding to one media provider (e.g., the example media provider 104), the example media provider 104 may receive return path data 100 from any number or type(s) of media presentation devices, at any number of locations. The media provider 104 transmits the collected return path data 100 to the example audience measurement system 114. Additionally or alternatively, the audience measurement system 114 may be hosted by any other entity or may be co-hosted by another entity (ies). For example, the example return path data 100 may be collected from the example media presentation devices 106 by a media provider (e.g., a cable television provider, a satellite television provider, etc.) and the example meter data 102 may be collected from an LPM (e.g., such as the example LPM 112) by the example audience measurement system 114 cooperating with the media provider to gain access to the tuning data. The example audience measurement system 114 includes the example return path data audience storage 118 (e.g., a database) and the example panelist data storage 120 (e.g., a database).

The example media output device 110 of FIG. 1 is a device capable of outputting the received media. For example, the media output device 110 may be a television, a radio, speakers, a projector, a computer, a computing device, a tablet, a mobile device, and/or any other device capable of outputting media. In some examples, the media output device 110 receives media over-the-air. In this manner, the media output device 110 receives media via an antenna and does not correspond to a media provider (e.g., including the example media provider 104). In the illustrated example of FIG. 1, the media output device 110 corresponds to one or more monitored panelists. The example LPM 112 monitors the panelists exposure to media output by the example media output device 110. For example, the example LPM 112 is in communication with the example media output device 110 to collect and/or capture signals emitted externally by the media output device 110. The LPM 112 may be coupled with the media output device 110 via wired and/or wireless connection. The example LPM 112 may be implemented in connection with additional and/or alternative types of media presentation devices, such as, for example, a radio, a computer monitor, a video game console, and/or any other device capable to present media to a user. The LPM 112 may be a portable people meter, a cell phone, a computing device, a sensor, and/or any other device capable of metering (e.g., monitoring) user exposure to media. In some examples, a media presentation location may include a group of LPMs 112. In such examples, the group of the LPMs 112 may be used to monitor media exposure for multiple users and/or media output devices 110. Additionally, the example panelist data storage 120 receives and stores the example meter data 102 from the example LPM 112.

In some examples, the example LPM 112 of FIG. 1 includes a set of buttons assigned to audience members to determine which of the audience members is watching the example media output device 110. The LPM 112 may periodically prompt the audience members via a set of LEDs, a display screen, and/or an audible tone, to indicate that the audience member is present at a first media presentation location by pressing an assigned button. In some examples, to decrease the number of prompts and, thus, the number of intrusions imposed upon the media consumption experience of the audience members, the LPM 112 prompts only when unidentified audience members are located at the first media presentation location and/or only after the LPM 112 detects a channel change and/or a change in state of the media output device 110. In some examples, the LPM 112 may additionally or alternatively include at least one sensor (e.g., a camera, 3-dimensional sensor, etc.) and/or be communicatively coupled to at least one sensor that detects a presence of the user in a first example media presentation location. The example LPM 112 transmits the example meter data 102 to the audience measurement system 114. The example meter data 102 includes the media presentation data (e.g., data related to media presented while the media output device 110 is on and a user is present). Although the illustrated example illustrates the example audience measurement system 114 collecting the example meter data 102 from one LPM 112 at one location, the example audience measurement system 114 may collect meter data from any number or type of meters at any number of locations.

The example return path data 100 of FIG. 1 from the example media presentation device 106 and/or the example meter data 102 from the example LPM 112 is transmitted to the example audience measurement system 114 via a network. The network may be implemented using any type of public or private network, such as, but not limited to, the Internet, a telephone network, a local area network (LAN), a cable network, and/or a wireless network. To enable communication via the network, the example media presentation device 106 includes a communication interface that enables a connection to an Ethernet, a digital subscriber line (DSL), a telephone line, a coaxial cable, or any wireless connection, etc.

The example modeler 116 of the example audience measurement system 114 of FIG. 1 collects the example return path data 100 corresponding to the example media presentation device(s) 106. As described above, the example return path data 100 includes tuning data of the example media presentation device 106. However, the example return path data 100 may not include specific data identifying any information relating to the audience of the example media output device 108. The example modeler 116 models such audience information. For example, the modeler 116 may assign and/or model virtual users to augment the example return path data 100, thereby generating audience assigned return path data. The example modeler 116 outputs the audience assigned return path data to the example return path data audience storage 118.

The example seed panel generator 122 of FIG. 1 gathers (A) the audience assigned return path data from the example return path data audience storage 118, (B) the example meter data 102 from the example panelist data storage 120, (C) and station data from the example station data storage 124 to generate a seed panel. As explained above, a seed panel is a panel including synthetic respondent level data from a set monitored panelists corresponding to the LPM(s) 112 selected based on a return path data audience and/or homes. The seed panelists are selected to represent the return path data audience and/or homes. The example seed panel generator 122 assigns virtual geography and income data to the persons and/or homes corresponding to the audience assigned return path data and the meter data 102. The example seed panel generator 122 initializes the seed panel by selecting monitored panelists to be representative of the viewer/geography/income assigned return path data audience. For example, a monitored panelist may be selected based on a similarity between (A) the location of the monitored panelist and the location of a return path data audience member, (B) demographics corresponding to the location of the return path data audience member and the demographics of the monitored panelist, (C) media viewing characteristics of the return path data audience and the monitored panelist, etc. The example station data storage 124 stores data related to station receivability by location (e.g., such as by county, market area, etc.). The example seed panel generator 122 uses the station data to calculate the station receivability for over the air homes. In some examples, the seed panel generator 122 filters the seed panelists to collect attributes of interest at the person level and/or the household level. Attributes of interest at the person level may include age, gender, ethnicity, nationality, race, etc., and attributes at the household level may include head of household data, cable data, single set data, ADS data, county data, metro data, income, zip code, number of televisions, pay service data, etc. The example seed panel generator 122 weights the seed panelists according to the universe estimate(s) of the designated market area. The example seed panel generator 122 stores the final seed panel in the example seed panel storage 126. The final seed panel includes synthetic respondent level data associated with the seed panel.

The example seed panel optimizer 128 of FIG. 1 adjusts the seed panel generated by the example seed panel generator 122 to satisfy target ratings and/or target household ratings based on constraints. Such constraints may include audience constraints, including quarter hour constraints, daypart constraints, daily constraints, weekly constraints, monthly constraints, etc. Such constraints may also include reach constraints, including daypart reach constraints, daily reach constraints, weekly reach constraints, monthly reach constraints, etc. In some examples, the seed panel optimizer 128 applies a discrete optimization greedy search to adjust the panels to satisfy the target ratings and/or target household ratings based on the constraints. The example seed panel optimizer 128 transmits the adjusted seed panel data with corresponding synthetic level data (e.g., data related to the media corresponding to the target rating) to the example population reach determination circuitry 130. The corresponding synthetic level data may include, for example, recorded audience marginal ratings of the media, population marginal ratings of the media, total reach of the recorded audience from marginal ratings, and a universe estimate. In some examples, parts of the synthetic level data may come from the adjusted seed panel and other parts may come from other data gathering devices and/or storage.

The example population reach determination circuitry 130 of FIG. 1 receives the recorded audience marginal ratings (e.g., from the meter data 102) for different marginals (e.g., quarter hours, half hours, hours, days, etc.) of given media, the population marginal ratings (e.g., from the return path data 100) for the different marginals of the media, the total reach (e.g., from the meter data 102) for the recorded audience and a total population size (e.g., the actual universe estimate) from one or more devices. For example, the obtain data corresponding to (1) how many panelists viewed different quarter hours of a particular show on television (e.g., recorded audience marginal ratings for different marginals), (2) how many total users viewed different quarter hours of the particular show on television (e.g., the population marginal ratings for the different marginals of the media), the total number of de-duplicated panelists that viewed the particular show across the different margins (e.g., the total reach for the recorded audience), and a number of users in a particular area (e.g., the total population size). Additionally or alternatively, the marginals may correspond to different websites, different webpages, different store visits, different programs, different stations, different media exposures, etc. In some examples, the example population reach determination circuitry 130 determines a total population reach for the given media based on the received data. The example population reach determination circuitry 130 determines the total population reach for the given media analytically using Equations 25, 26 and/or 27, thereby reducing memory and/or processing resources associated with the traditional numerical calculation. The example population reach determination circuitry 130 outputs the reach output to another device and/or user and can reuse the panel representation value for subsequent reach determinations, thereby reducing memory and/or processing resources. The example population reach determination circuitry 130 is further described in conjunction with FIG. 2.

In the illustrated example, the example audience measurement system 114 includes one or more media monitoring applications 132 to process the media identification information and match duration information output by the population reach determination circuitry 130 to perform one or more operations based on that information. For example, the media monitoring application(s) 132 may include a media crediting application to credit media exposure at a media presentation environment to the reference media asset represented by the media identification information output by the population reach determination circuitry 130. Additionally or alternatively, the media monitoring application(s) 132 may include one or more dynamic advertisement insertion applications to utilize the media identification information output by the population reach determination circuitry 130 to select companion media, targeted commercials, etc., to provide to the media presentation devices 106 for presentation. Additionally or alternatively, the media monitoring application(s) 132 may include one or more secondary media selection insertion applications to utilize the media identification information output by the population reach determination circuitry 130 to select secondary media to provide to secondary media devices (e.g., such as a smartphone and/or computer associated with one or more of panelist) for presentation in association with the monitored media being presented by the media presentation device 106. In some examples, the medio monitoring application(s) 132 is implemented in and/or as part of the population reach determination circuitry 130.

Figure 2:
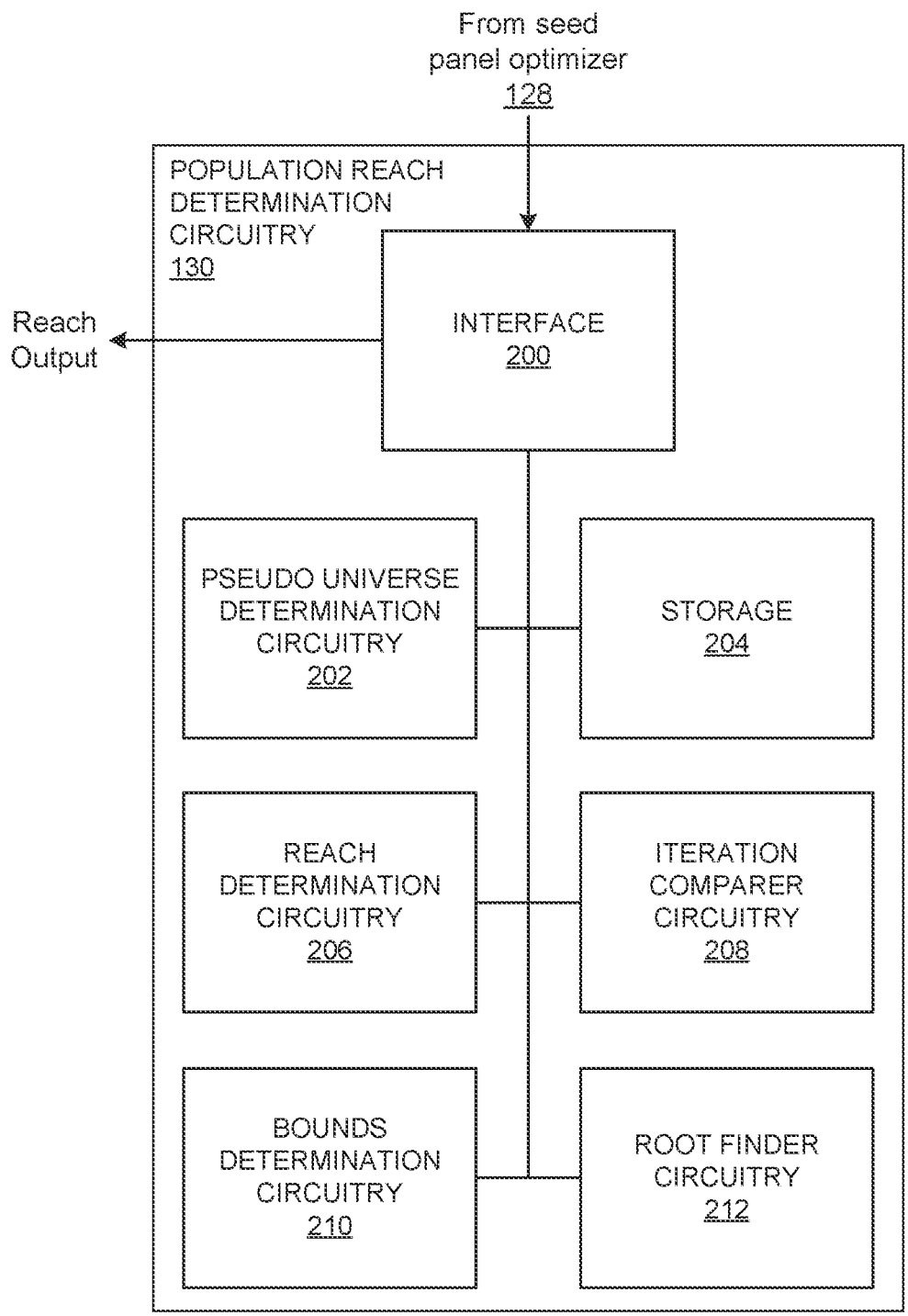
FIG. 2 is a block diagram of an example implementation of an example population reach determiner included in the example audience measurement system of FIG. 1.

FIG. 2 is a block diagram of an example implementation of the example population reach determination circuitry 130 of FIG. 1 to determine population reach for given media based on marginal ratings data. The example population reach determination circuitry 130 of FIG. 2 includes an example interface 200, an example pseudo universe determination circuitry 202, an example storage 204, an example reach determination circuitry 206, an example iteration comparer circuitry 208, an example bounds determination circuitry 210, and an example root finder circuitry 212. Although the example population reach determination circuitry 130 is described in conjunction with data generated by the example seed panel optimizer 128 of FIG. 1, the example population reach determination circuitry 130 may determine reach based on information provided by any device that is capable of outputting audience marginal ratings, population marginal ratings, audience reach from the different marginal ratings, and universe estimates. For example, the example population reach determination circuitry 130 may determine reach from marginal ratings for different programs, different stations different channels, different media, stores visits for different stores, different website visits, etc. The population reach determination circuitry 130 may determine population reach based on any data that relates to a recorded audience to a population (e.g., panelist data, survey data, etc.), regardless if the recorded audience is included in the population.

The example interface 200 of FIG. 2 receives recorded audience marginal ratings corresponding to media for two or more margins (e.g., quarter hours), population audience marginal ratings corresponding to the media for the two or more margins, recorded audience reach from two or more marginal ratings, and a universe estimate of users. As described above, although the illustrated example of FIGS. 1 and 2 include the example seed panel optimizer 128 providing such data, the data may come from any device and/or may correspond to any type of data (e.g., website exposures, store entries, etc.) related to media exposure at different marginals. In the illustrated example, the marginals are broken up into quarter hours. For example, the recorded and/or population audience marginal ratings may correspond to four quarter hour marginals of an hour media program. However, the marginals may be broken up into any increments of time (hours, days, etc.). Additionally, the example interface 200 may output an estimated population reach (e.g., reach output) to another device/system and/or as a report to a user. In some examples, the interface 200 includes a panel representation value and/or a panelist correlation value (described below) with the transmission of the determined reach. In some examples, the example interface 200 may be two interfaces (e.g., a first interface to receive the datasets and a second interface to output the reach).

The example interface 200 of FIG. 2 is an example means for receiving (e.g., accessing, obtaining, etc.) recorded audience marginal ratings (e.g., recorded audience exposure values) corresponding to media for two or more margins (e.g., quarter hours), population audience marginal ratings (e.g., population audience exposure values) corresponding to the media for the two or more margins, recorded audience reach (e.g., the de-duplicated recorded audience normalized to the recorded audience universe estimate) from two or more marginal ratings, and a universe estimate of users. Additionally, the interface 200 is an example means for outputting an estimated population reach (e.g., reach output).

The example pseudo universe determination circuitry 202 of FIG. 2 generates and/or adjusts pseudo universe estimates as part of a process to determine population reach. As described above, a pseudo universe corresponds to what the size of the universe of individuals capable of being in a given audience would need to be to achieve the ratings and reach values for that audience if the different marginal ratings are assumed to be independent, regardless of how much dependence actually exists. As further described below in conjunction with FIGS. 3-4, the example pseudo universe determination circuitry 202 initializes the pseudo universe estimate of the recorded audience and, in subsequent iterations, updates (e.g., adjusts) the initial pseudo universe estimate of the recorded audience until the pseudo universe estimate of the recorded audience converges to an appropriate estimate. As further described below in conjunction with FIGS. 5-7, the example pseudo universe determination circuitry 202 initializes the pseudo universe estimate of the population audience and, in subsequent iterations, updates (e.g., adjusts) the initial pseudo universe estimate of the population audience until a root equation is solved.

After the example pseudo universe determination circuitry 202 of FIG. 2 determines the recorded pseudo universe estimate via an iterative process, the example pseudo universe determination circuitry 202 determines the panel representation value using the above Equation 9. In some examples, the pseudo universe determination circuitry 202 may determine the panelist correlation value (r*) based on panelist representation value. As described above, the pseudo universe determination circuitry 202 stores an audience relationship value in the example storage 204 so that it can be used to determine the current reach and/or a subsequent reach for subsequent media without needing to recalculate the audience relationship value, thereby eliminating the iterative process for subsequent reach determination to determine the audience relationship value. As described above, the audience relationship value can be represented by either the panel representation value or the panelist correlation value. The example pseudo universe determination circuitry 202 may redetermine the audience relationship value periodically, aperiodically, and/or based on changes to the panel or the total audience.

The panelist correlation value represents a deviation from independence of the datasets (e.g., the data from the panel and the data from the total audience). For example, the panelist correlation value (r*) being close to one represents a strong correlation, the panelist correlation value (r*) being close to zero represents strong independence, and the panelist correlation value (r*) being close to negative one represents strongly disjoint data sets. As described above, the interface 200 may include the audience relationship value (e.g., the panel representation value and/or the panelist correlation value) with the transmission of the reach determination.

The example pseudo universe determination circuitry 202 of FIG. 2 is an example means for determining, generating, adjusting, and/or iteratively converging on pseudo universe estimates. Additionally, the example pseudo universe determination circuitry 202 is an example means for determining, redetermining, calculating, recalculating, and/or storing the audience relationship value (e.g., the panel representation value and/or the panelist correlation value).

The example reach determination circuitry 206 of FIG. 2 generates and/or adjusts reach estimates until the reach satisfies a root of an equation. As described above, the reach is a de-duplicated audience value corresponding to the total audience of given media who contributed to at least one of the different marginal ratings of the media normalized to a universe estimate. The example reach determination circuitry 206 generates and/or adjusts total population reach to increase the efficiency of the reach calculation. In some examples, the reach determination circuitry 206 determines the reach as a de-duplicated audience value normalized to a population size. As further described below in conjunction with FIG. 7, the example reach determination circuitry 206 solves for the reach based on a value of the pseudo universe estimate of the population audience and, in subsequent iterations, updates (e.g., adjusts) the total audience reach based on an updated pseudo universe estimate of the population audience until the root equation is satisfied. The example reach determination circuitry 206 of FIG. 2 is an example means for determining, generating, and/or adjusting reach estimates.

The example iteration comparer circuitry 208 of FIG. 2 compares (A) a pseudo universe of the recorded audience determined during a previous iteration to a pseudo universe of the recorded audience determined during a subsequent iteration and/or (B) a finite upper bound determined during a previous iteration to a finite upper bound determined during a subsequent iteration. In some examples, the iteration comparer circuitry 208 compares the pseudo universe estimates and/or the finite upper bounds by applying a mathematical difference. In such examples, the difference corresponds to an error of the estimate. The lower the difference, the lower the error and vice versa. The example iteration comparer circuitry 208 determines whether or not to continue performing iterations to further converge the pseudo universe estimate of the recorded audience and/or the finite upper bound, thereby increasing the accuracy of the estimated reach. For example, the iteration comparer circuitry 208 may continue to converge the pseudo universe estimate and/or the finite upper bound until the error satisfies an error threshold. The error threshold may be based on user and/or manufacture preferences. The example iteration comparer circuitry 208 of FIG. 2 is an example means for comparing (e.g., by applying a mathematical difference) data across iterations. Additionally, the example iteration comparer circuitry 208 is an example means for determining whether or not to continue performing iterations based on an error determination.

The example bounds determination circuitry 210 of FIG. 2 generates and/or adjusts bounds for the pseudo universe estimate of the population audience as part of a process to determine population reach. As further described below in conjunction with FIGS. 5-6, the example bounds determination circuitry 210 determines a first intermediate bounds and a second intermediate bounds. The example bounds determination circuitry 210 determines a final bounds for the pseudo universe estimate of the population audience based on the first intermediate bounds and the second intermediate bounds. In some examples, the bounds determination circuitry 210 initializes a bound (e.g., a finite upper bound) and, in subsequent iterations, updates (e.g., adjusts) the initial bound until the bound converges to an appropriate value. The example bounds determination circuitry 210 of FIG. 2 is an example means for determining, generating, adjusting, and/or iteratively converging on bounds of the pseudo universe estimate of the population audience.

The example root finder circuitry 212 of FIG. 2 tests values for variables in an equation to determine if the equation is satisfied as a root. For example, the root finder circuitry 212 tests a value of the pseudo universe estimate of the population audience and a value of the population reach to determine if Equation 27 is satisfied as a root. For example, the root finder circuitry 212 can substitute the value of the pseudo universe estimate of the population audience and the value of the population reach into Equation 27 to find a value of the left-hand side of Equation 27. If the root finder circuitry 212 finds the left-hand side of Equation 27 is equal to zero, the root finder circuitry 212 determines that Equation 27 is satisfied as a root. If the root finder circuitry 212 finds the left-hand side of Equation 27 is not equal to zero, the root finder circuitry 212 determines that Equation 27 is not satisfied as a root. The example root finder circuitry 212 determines whether or not to continue performing iterations of the equation variables to find a root of the equation. For example, the root finder circuitry 212 may determine that the value of the pseudo universe estimate of the population audience and the value of the population reach do not satisfy a root of Equation 27. Therefore, the root finder circuitry 212 can determine to continue iterating the pseudo universe estimate of the population audience within the bounds to find a root of Equation 27. The example root finder circuitry 212 of FIG. 2 is an example means for determining whether or not a root equation is satisfied. Additionally, the example root finder circuitry 212 is an example means for determining whether or not to continue performing iterations based on a root satisfaction.

In some examples, the population reach determination circuitry 130 or a similar apparatus includes means for determining an audience relationship value. For example, the means for determining an audience relationship value may be implemented by the example pseudo universe determination circuitry 202. In some examples, the means for determining an audience relationship value may be implemented by machine executable instructions such as that implemented by at least blocks 306 of FIG. 3 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the means for determining an audience relationship value is implemented by other hardware logic circuitry, hardware implemented state machines, and/or any other combination of hardware, software, and/or firmware. For example, the means for determining an audience relationship value may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the population reach determination circuitry 130 or a similar apparatus includes means for determining bounds of a pseudo universe estimate of a population audience. For example, the means for determining bounds of a pseudo universe estimate of a population audience may be implemented by the example bounds determination circuitry 210. In some examples, the means for determining bounds of a pseudo universe estimate of a population audience may be implemented by machine executable instructions such as that implemented by at least blocks 502, 504, 506, 508 of FIG. 5, and/or blocks 602, 604, 606, 608, 610, 614, 616 of FIG. 6 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the means for determining bounds of a pseudo universe estimate of a population audience is implemented by other hardware logic circuitry, hardware implemented state machines, and/or any other combination of hardware, software, and/or firmware. For example, the means for determining bounds of a pseudo universe estimate of a population audience may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the population reach determination circuitry 130 or a similar apparatus includes means for iteratively determining a pseudo universe estimate of the population audience and a second de-duplicated audience value for the population audience. For example, the means for iteratively determining a pseudo universe estimate of the population audience and a second de-duplicated audience value for the population audience may be implemented by the example population reach determination circuitry 130. In some examples, the means for iteratively determining a pseudo universe estimate of the population audience and a second de-duplicated audience value for the population audience may be implemented by machine executable instructions such as that implemented by at least blocks 308 of FIG. 3, and/or blocks 510 of FIG. 5, and/or blocks 702, 704, 706, 710, 712 of FIG. 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the means for iteratively determining a pseudo universe estimate of the population audience and a second de-duplicated audience value for the population audience is implemented by other hardware logic circuitry, hardware implemented state machines, and/or any other combination of hardware, software, and/or firmware. For example, the means for iteratively determining a pseudo universe estimate of the population audience and a second de-duplicated audience value for the population audience may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the population reach determination circuitry 130 or a similar apparatus includes means for iteratively converging on a pseudo universe estimate of the recorded audience. For example, the means for iteratively converging on a pseudo universe estimate of the recorded audience may be implemented by the example pseudo universe determination circuitry 202. In some examples, the means for iteratively converging on a pseudo universe estimate of the recorded audience may be implemented by machine executable instructions such as that implemented by at least blocks 304 of FIG. 3, and/or blocks 402, 404, 408, 410 of FIG. 4 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the means for iteratively converging on a pseudo universe estimate of the recorded audience is implemented by other hardware logic circuitry, hardware implemented state machines, and/or any other combination of hardware, software, and/or firmware. For example, the means for iteratively converging on a pseudo universe estimate of the recorded audience may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the population reach determination circuitry 130 or a similar apparatus includes means for outputting the second de-duplicated audience value. For example, the means for outputting may be implemented by the example interface 200. In some examples, the means for outputting may be implemented by machine executable instructions such as that implemented by at least block 310 of FIG. 3 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the means for outputting is implemented by other hardware logic circuitry, hardware implemented state machines, and/or any other combination of hardware, software, and/or firmware. For example, the means for outputting may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the population reach determination circuitry 130 of FIG. 1 is illustrated in FIG. 2, one or more of the elements, processes, and/or devices illustrated in FIG. 2 may be combined, divided, re-arranged, omitted, eliminated, and/or implemented in any other way. Further, the example interface 200, the example pseudo universe determination circuitry 202, the example storage 404, the example reach determination circuitry 206, the example iteration comparer circuitry 208, the example bounds determination circuitry 210, the example root finder circuitry 212, and/or, more generally, the example population reach determination circuitry 130 of FIG. 1, may be implemented by hardware, software, firmware, and/or any combination of hardware, software, and/or firmware. Thus, for example, any of the example interface 200, the example pseudo universe determination circuitry 202, the example storage 404, the example reach determination circuitry 206, the example iteration comparer circuitry 208, the example bounds determination circuitry 210, the example root finder circuitry 212, and/or, more generally, the example population reach determination circuitry 130, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example interface 200, the example pseudo universe determination circuitry 202, the example storage 404, the example reach determination circuitry 206, the example iteration comparer circuitry 208, the example bounds determination circuitry 210, the example root finder circuitry 212, and/or the example population reach determination circuitry 130 is/are hereby expressly defined to include a non-transitory computer readable storage device or storage disk such as a memory, a digital versatile disk (DVD), a compact disk (CD), a Blu-ray disk, etc., including the software and/or firmware. Further still, the example population reach determination circuitry 130 of FIG. 1 may include one or more elements, processes, and/or devices in addition to, or instead of, those illustrated in FIG. 2, and/or may include more than one of any or all of the illustrated elements, processes and devices.

Flowcharts representative of example hardware logic circuitry, machine readable instructions, hardware implemented state machines, and/or any combination thereof for implementing the population reach determination circuitry 130 of FIG. 2 are shown in FIGS. 3-7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program(s) may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program(s) is(are) described with reference to the flowcharts illustrated in FIGS. 3-7, many other methods of implementing the example population reach determination circuitry 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 3:
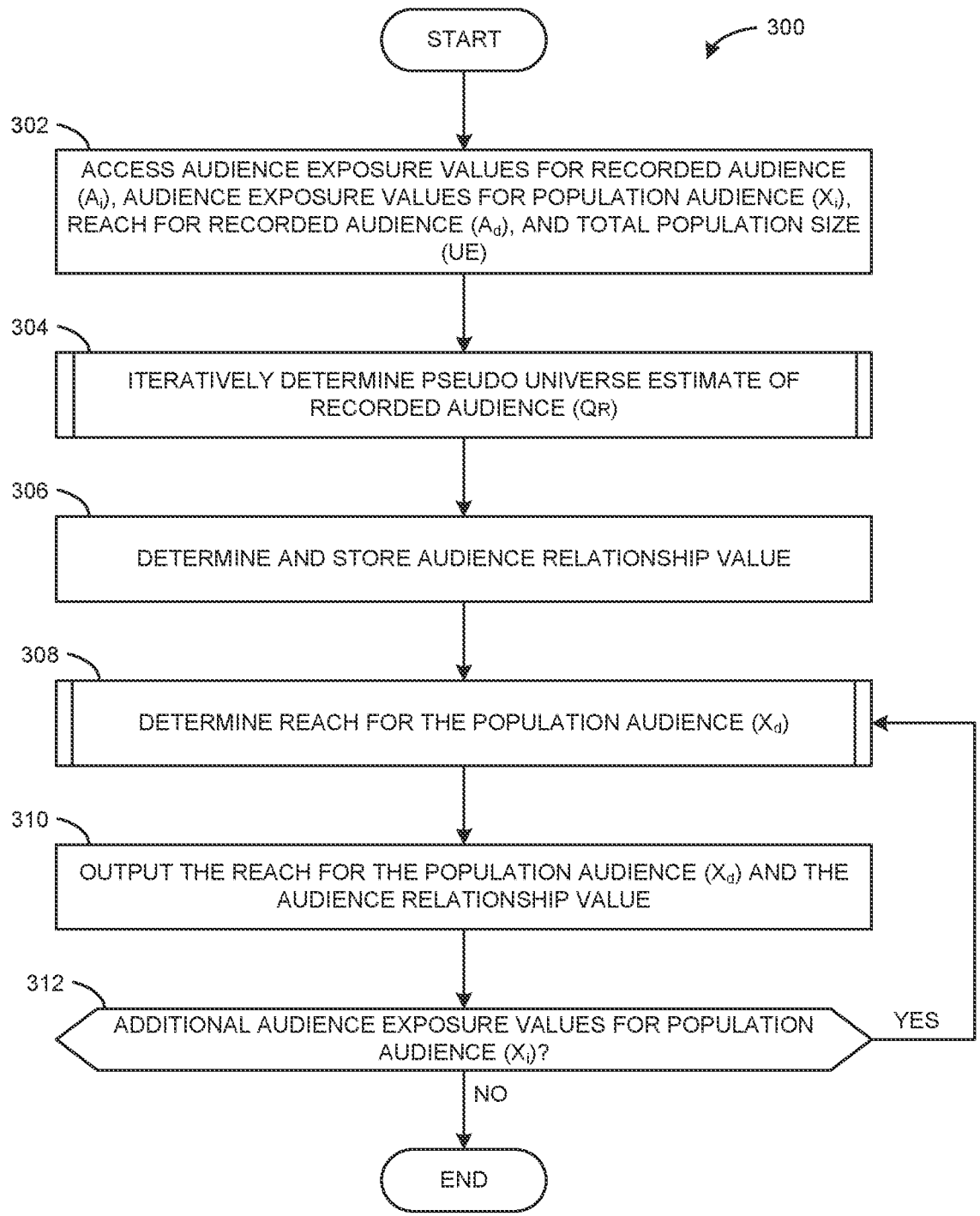
FIGS. 3-7 are a flowcharts representative of example machine readable instructions that may be executed by example processor circuitry to implement the example population reach determiner of FIGS. 1 and/or 2.

FIG. 3 is a flowchart representative of example machine readable instructions and/or example operations 300 that may be executed and/or instantiated by processor circuitry to determine a total audience reach (e.g., the de-duplicated audience value for the population normalized to the population size) from audience exposure values (e.g., marginal ratings). Although the instructions of FIG. 3 are described in conjunction with population reach determination based on quarter hour marginals of media exposure performed by the example population reach determination circuitry 130 of FIGS. 1 and 2, the example instructions may be utilized to determine reach based on any type of media and/or marginal from any type of rating data. Although the below calculations are based on percentages (e.g., where each total is a percentage of the universe estimate), the below calculations may be based on total audience numbers by slightly modifying the above Equations 1-13 (e.g., replacing totals with percentage of the UE and replacing UE with 1 or 100%).

At block 302, the example interface 200 accesses audience exposure values for the recorded audience (e.g., based on the meter data 102), audience exposure values for the population audience (e.g., based on the return path data 100), reach (e.g., the de-duplicated audience value normalized to the universe estimate) for the recorded audience (e.g., based on the meter data 102), and a total population size (e.g. universe estimate). For example, the below example table (Table 1) includes audience exposure values (e.g., marginal ratings) of a recorded audience and corresponding reach (e.g., the de-duplicated audience value normalized to the universe estimate) of the recorded audience for a 1-hour program broken up into 4 quarter hour margins (e.g., represented as percentages of the UE), where the entries include percentages of people exposed to media relative to a total universe estimate represented by 100% (e.g., or 1). For example, 10% reflects 100 people out of the 1000 universal estimate.

TABLE 1

Example Data

| UE = 100% (e.g., corresponding to 1,000 persons) | Recorded audience (percent) | Population Audience (percent) |
|---|---|---|
| A | 6% | 7.5% |
| B | 8% | 7% |
| C | 4% | 6% |
| D | 5% | 5% |
| Total | $A_d$ = 10% | $X_d$? |

At block 304, the example population reach determination circuitry 130 performs processing operations to iteratively determine the pseudo universe estimate ($Q_R$) of the recorded audience, as further described below in conjunction with FIG. 4. At block 306, the example pseudo universe determination circuitry 202 determines the audience relationship value based on the pseudo universe estimate and stores the audience relationship value in the example storage 204. For example, the pseudo universe determination circuitry 202 determines the panel representation value using Equation 9. Using the information of the example of Table 1, if the total recorded audience reach $A_d$ is 10% and the example pseudo universe determination circuitry 202 determines $Q_R$=0.103028, the example pseudo universe determination circuitry 202 determines that the panel representation value to be 0.00336

$$\left(r = \frac{0.103028 - 0.1}{1 - 0.1}\right).$$

In another example, the pseudo universe determination circuitry 202 determines the panelist correlation value using Equation 11. Using the panel representation value of 0.00336, the example pseudo universe determination circuitry 202 determines the panelist correlation value to be 0.993293

$$\left(e.g., r^* = \frac{1 - 0.00336}{1 + 0.00336}\right).$$

The example pseudo universe determination circuitry 202 can select the panel representation value and/or the panelist correlation value to represent the audience relationship value and then store the selected audience relationship value.

At block 308, the example population reach determination circuitry 130 performs processing operations to determine a reach (e.g., the de-duplicated audience value for the population normalized to the population size) of the population audience based on the audience relationship value and the audience exposure values (e.g., the audience exposure values for the population audience, the audience exposure values for the recorded audience and/or the total population size). The determination performed at block 308 is further described below in conjunction with FIGS. 5-7. At block 310, the example interface 200 outputs the population reach and/or the audience relationship value. The example interface 200 may output the population reach and/or the audience relationship value as a signal for further processing and/or as a report to a user (e.g., customer). At block 312, the example reach determination circuitry 206 determines if there are additional audience exposure values for reach determination (e.g., subsequently obtained population totals, data for a different total audience, data from different media, data from a different media provider, etc.). For example, the interface 200 may obtain second audience exposure values (e.g., marginal data) from a second population for second media corresponding to the below Table 2 different than the first audience exposure values (e.g., marginal data) from the first population for the first media from Table 1 (e.g., for a different show), from a second media provider different than the first media provider from Table 1 (e.g., if the data from Table 1 is from a first media provider and the data from the below Table 2 is from a second media provider), from a second total audience different from a first total audience (e.g., if the data from Table 1 is for a first audience at a first region and the data from the below Table 2 is for a second audience at a second region), etc., as shown below in Table 2.

TABLE 2

Example Data

| UE = 100% (e.g., corresponding to 1,000 persons) | Population Audience (percent) |
|---|---|
| A | 12% |
| B | 10% |
| C | 7% |
| D | 13% |
| Total | $X_d$? |

In such an example, control can return to block 308 and the population reach determination circuitry 130 can determine a population reach for the different at least one of media, media provider, marginals, etc., based on the audience exposure values (e.g., marginal data) from Table 2 and the audience relationship value determined at block 306 without performing the iterative process of block 304, thereby conserving processor resources and time.

If the example reach determination circuitry 206 determines that additional population audience exposure values are available for an additional reach determination (block 312: YES), control returns to block 308 to estimate the reach for the additional audience exposure values. For example, if there is a subsequent population data for the same media or different media (e.g., from the same or a different media provider) and/or a different number for the total audience, control would return to block 308 to perform the reach determination for the subsequent population data. As described above, for subsequent audience parameters, the reach can be determined using the audience relationship value without re-determining the pseudo universe estimate for the recorded audience because the audience relationship value has been stored and can be used to determine the reach. If the example reach determination circuitry 206 determines that additional population audience exposure values are not available (block 312: NO), the flowchart of FIG. 3 ends.

Figure 4:
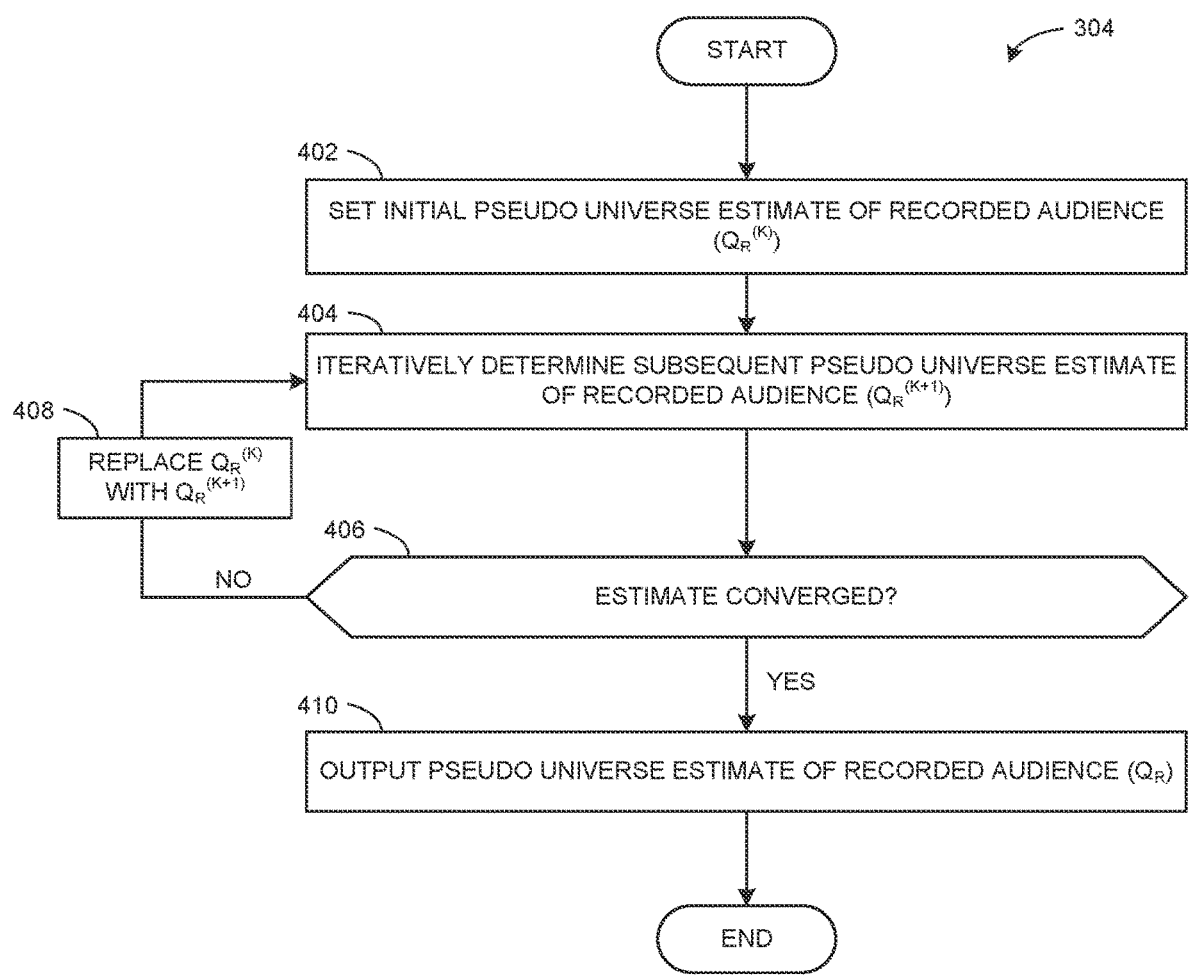

FIG. 4 is an example flowchart representative of example machine readable instructions 304 that may be executed by the example population reach determination circuitry 130 of FIGS. 1 and/or 2 to perform processing operations to iteratively determine the pseudo universe estimate of the recorded audience. The example flowchart of FIG. 4 is described in conjunction with the above Table 1.

At block 402, the example pseudo universe determination circuitry 202 sets the initial pseudo universe estimate of the recorded audience ($Q_R^k$). In some examples, the pseudo universe determination circuitry 202 sets the initial pseudo universe estimate of the recorded audience ($Q_R^k$) to be representative of the total population size (UE). For example, using the Table 1, the example pseudo universe determination circuitry 202 determines the initial pseudo universe estimate of recorded audience to be 1 or 100% (e.g., $Q_R^0=1$).

At block 404, the example pseudo universe determination circuitry 202 iteratively updates the pseudo universe estimate of the recorded audience ($Q_R^{k+1}$), as shown in Equation 8. Using the example of Table 1, the example pseudo universe determination circuitry 202 determines the subsequent pseudo universe of recorded audience ($Q_R^1$) to be 0.473255

$$\left( e.g., \frac{0.1}{1-\left(1-\frac{0.06}{1}\right)\left(1-\frac{0.08}{1}\right)\left(1-\frac{0.04}{1}\right)\left(1-\frac{0.05}{1}\right)} \right).$$

At block 406, the example iteration comparer circuitry 208 determines if the pseudo universe estimate is converged. For example, the iteration comparer circuitry 208 determines if an error corresponding to a comparison of the subsequent pseudo universe of recorded audience and current pseudo universe of recorded audience satisfies a second error threshold. The example iteration comparer circuitry 208 can calculate an error by computing the mathematical difference between the subsequent pseudo universe of the recorded audience and the current pseudo universe of the recorded audience. Using the example of Table 1, the iteration comparer circuitry 208 calculates the error to be 0.526745 (e.g., |0.473255−1|, because $Q_R^1=0.473255$ and $Q_R^0=1$). The first threshold error corresponds to the granularity of the population audience reach and may be set or adjusted based on user and/or manufacture preferences. In some examples, the second error threshold is the same as the first error threshold.

If the example iteration comparer circuitry 208 determines that the second error corresponding to the comparison of the subsequent pseudo universe of the recorded audience and the current pseudo universe of the recorded audience does not satisfy the second error threshold (block 406: NO), the example pseudo universe determination circuitry 202 replaces the current pseudo universe of the recorded audience with the subsequent pseudo universe of the recorded audience (block 408) and the process returns to block 404 to perform a subsequent iteration until the error is reduced to satisfy the second error threshold. If the example iteration comparer circuitry 208 determines that the second error corresponding to the comparison of the subsequent pseudo universe of the recorded audience and the current pseudo universe of the recorded audience satisfies the second error threshold (block 406: YES), the example pseudo universe determination circuitry 202 determines the pseudo universe of the recorded audience ($Q_R$) based on the current pseudo universe of the recorded audience (block 410). For example, after performing the iterative process using the example data of Table 1, the example pseudo universe determination circuitry 202 determines the pseudo universe of the recorded audience to be $Q_R=0.103028$.

Figure 5:
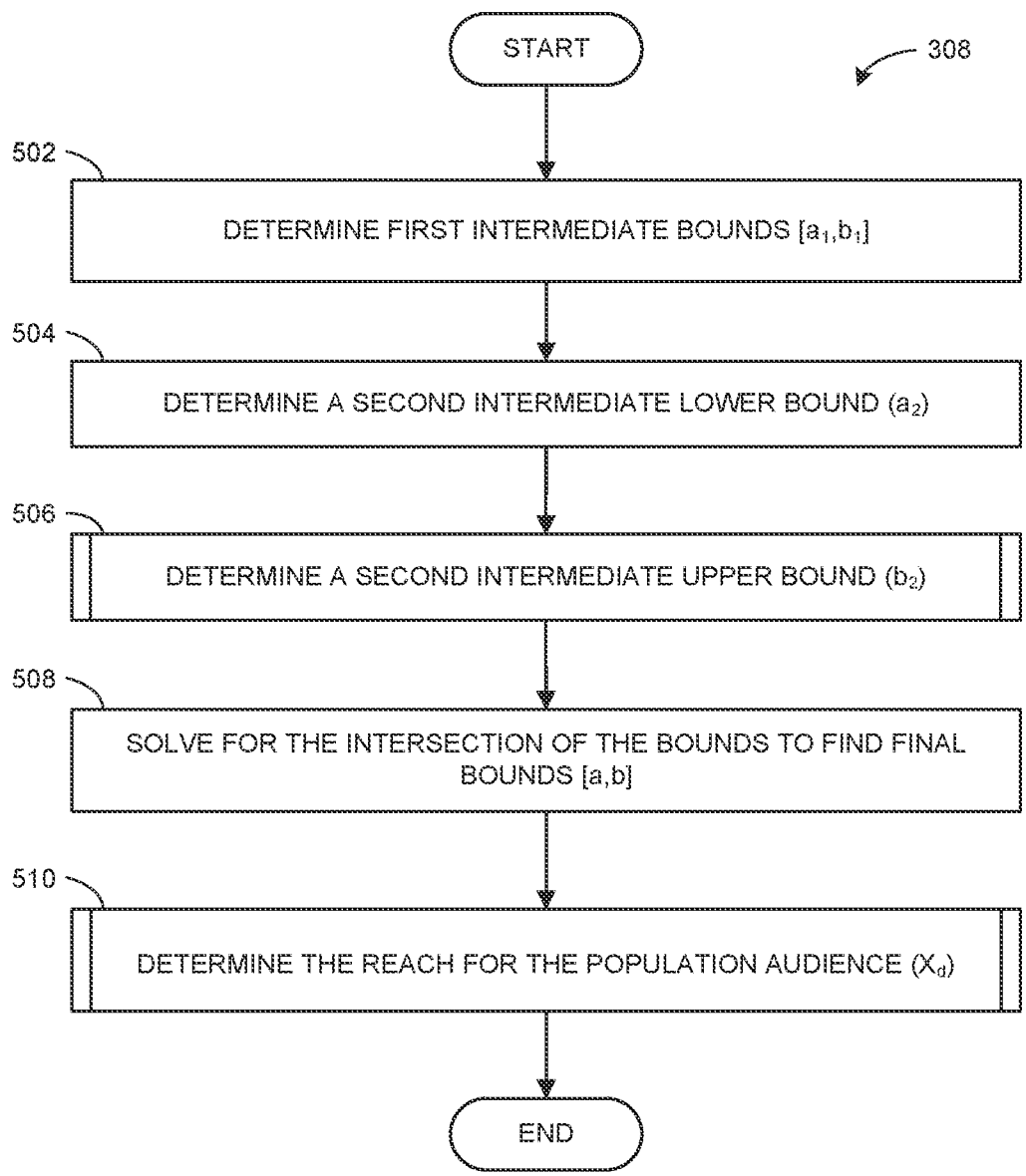

FIG. 5 is an example flowchart representative of example machine readable instructions 308 that may be executed by the example population reach determination circuitry 130 of FIGS. 1 and/or 2 to perform processing operations to determine reach (e.g., de-duplicated audience value for the population normalized to the population size) of the population audience. Although the instructions of FIG. 5 are described in conjunction with a reach determination based on quarter hour margins of media exposure from the example population reach determination circuitry 130 of FIGS. 1 and 2, the example instructions may be utilized to determine reach based on any type of media and/or marginals from any type of ratings data. The example flowchart of FIG. 5 is described in conjunction with the above Table 1.

The example bounds determination circuitry 210 executes the instructions of FIG. 5 to determine bounds of the pseudo universe estimate of the population audience. At block 502, the bounds determination circuitry 210 determines first intermediate bounds of the pseudo universe estimate of the population audience. For example, the bounds determination circuitry 210 determines the first intermediate bounds based on the audience relationship value (e.g., the panel representation value and/or the panelist correlation value) and the audience exposure values (e.g., marginal ratings) for the population audience and Equations 12-13. As described above, a maximum audience exposure value (M), a sum of audience exposure values (S), and a minimum of the sum of audience exposure values and one (S+) are calculated by the bounds determination circuitry 210 for the population audience using Equations 14-16. Using the example of Table 1, the bounds determination circuitry 210 determines the maximum audience exposure value (M) to be 0.075 (e.g., maximum of [0.075, 0.07, 0.06, 0.05]). Using the example of Table 1, the bounds determination circuitry 210 determines the sum of the audience exposure values (S) to be 0.255 (e.g., sum of [0.075, 0.07, 0.06, 0.05]). Using the example of Table 1, the bounds determination circuitry 210 determines the minimum of the sum of the audience exposure values and one (S+) to be 0.255 (e.g., min of [0.255, 1]).

Having solved for the maximum audience exposure value (M), the sum of audience exposure values (S), and the minimum of the sum of audience exposure values and one (S+), the bounds determination circuitry 210 can proceed with determining the first intermediate bounds. The first intermediate bounds depend on the value of the panel representation value. For example, if the panel representation value is between zero and one, the bounds determination circuitry 210 can use Equations 17-18 to solve for a first intermediate lower bound and a first intermediate upper bound. If the panel representation value is not between zero and one, the example bounds determination circuitry 210 can use Equations 19-20 to solve for the first intermediate lower bound and the first intermediate upper bound. Using the example of Table 1, the panel representation value (r) is found to be 0.00336 by the pseudo universe determination circuitry 202 as discussed above. Because the panel representation value is between zero and one, the bounds determination circuitry 210 can use Equations 17-18 to determine the first intermediate bounds. For example, the bounds determination circuitry 210 determines the first intermediate lower bound ($a_1$) to be 0.0781 ($a_1$=0.00336+(1−0.00336)*0.075). Additionally, the example bounds determination circuitry 210 determines the first intermediate upper bound ($b_1$) to be 0.258 ($b_1$=0.00336+(1−0.00336)*0.255). Therefore, the example bounds determination circuitry 210 determines the first intermediate bounds [$a_1$, $b_1$] to equal [0.0781, 0.258].

Next, the example bounds determination circuitry 210 begins determining second intermediate bounds based on Equations 12 and 3b. At block 504, the bounds determination circuitry 210 determines a second intermediate lower bound ($a_2$). As discussed above, based on Equation 3b and the bounds determined in Equation 12, the second intermediate lower bound ($a_2$) is equal to the maximum audience exposure value (M) for the population audience. For example, using Table 1, the bounds determination circuitry 210 determines the second intermediate lower bound ($a_2$) to be 0.075. At block 506, the bounds determination circuitry 210 determines a second intermediate upper bound ($b_2$) as discussed further below in conjunction with FIG. 6. Having determined both the first intermediate bounds and the second intermediate bounds, the bounds determination circuitry 210 can solve for the final bounds [a, b] by finding the set intersection of the first intermediate bounds and the second intermediate bounds (block 508). At block 510, the population reach determination circuitry 130 determines the reach (e.g., the de-duplicated audience value for the population normalized to the population size) for the population audience using a root finding algorithm as discussed further below in conjunction with FIG. 7.

Figure 6:
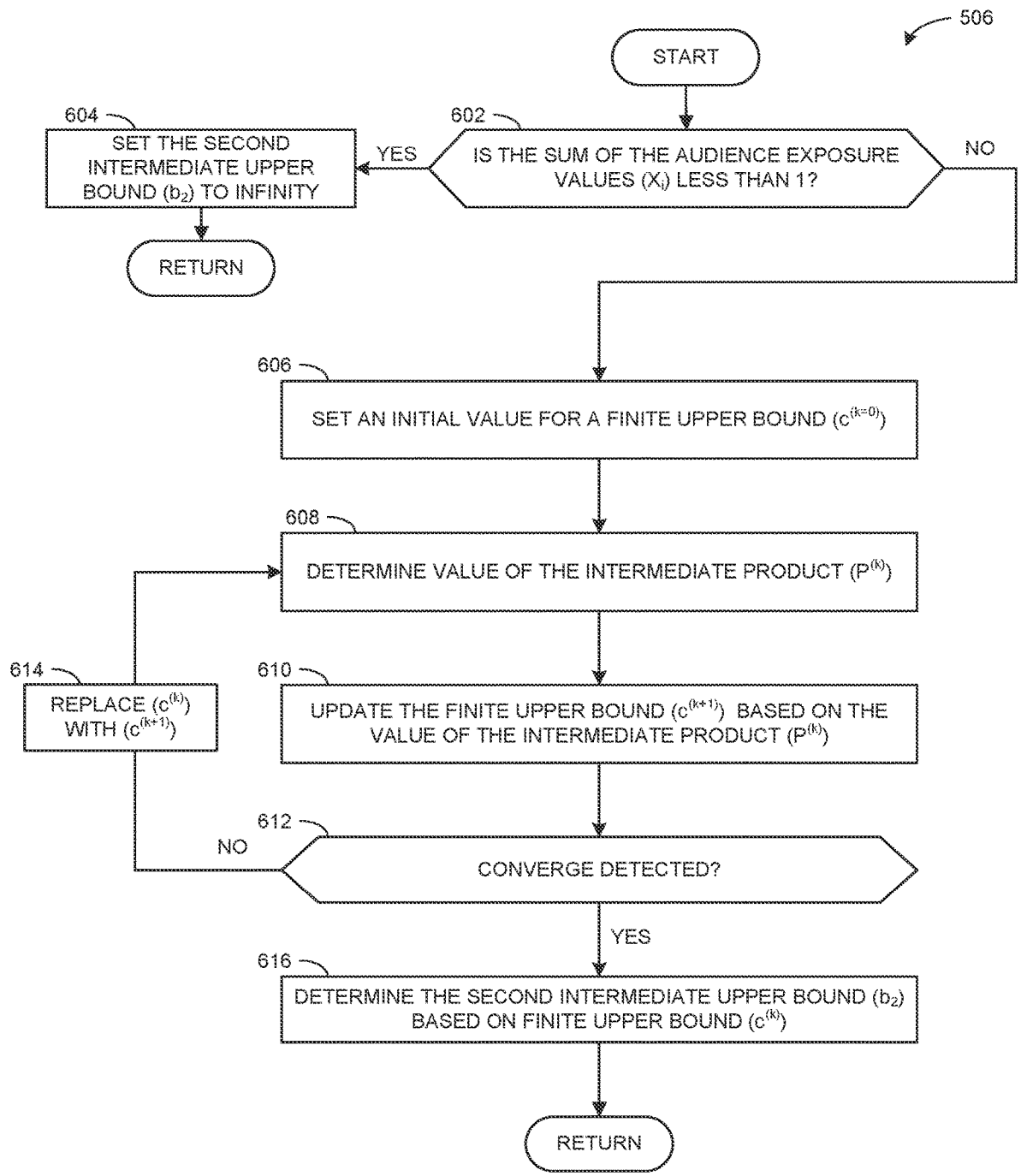

FIG. 6 is an example flowchart representative of example machine readable instructions 506 that may be executed by the example population reach determination circuitry 130 of FIGS. 1 and/or 2 to perform processing operations to determine bounds of the pseudo universe estimate of the population audience. In particular, the machine readable instructions 506 of FIG. 6 may be executed by the example population reach determination circuitry 130 to determine a second intermediate upper bound ($b_2$) of the pseudo universe estimate of the population audience.

At block 602, the bounds determination circuitry 210 determines if the sum of the audience exposure values (S) is less than one. If the sum of the audience exposure values (S) is less than one (block 602: YES), the pseudo universe estimate of the population audience can be unbounded (e.g., infinite) as described above. Therefore, control passes to block 604 wherein the bounds determination circuitry 210 sets the second intermediate upper bound ($b_2$) to infinity. In this example, the process of FIG. 6 is complete and control passes back to FIG. 5. If the sum of the audience exposure values (S) is greater than one (block 602: NO), the bounds determination circuitry 210 determines that the second intermediate upper bound ($b_2$) is not infinite and is equal to a finite upper bound value (c). The process flow passes to block 606 for the bounds determination circuitry 210 to determine the finite upper bound value (c) using an iterative process. At block 606, the example bounds determination circuitry 210 sets an initial value for the finite upper bound value ($c^{(k=0)}$). For example, the bounds determination circuitry 210 can set the initial value for the finite upper bound value to one (e.g., $c^0$=1).

At block 608, the example bounds determination circuitry 210 determines a value of the intermediate product ($P^{(k)}$). For example, the value of the intermediate product ($P^{(k)}$) can be determined using Equation 22 wherein the intermediate product (P) is based on the finite upper bound value (c) and the audience exposure values ($X_1$) for the population audience. In some examples, the value of the intermediate product determined at block 608 is an initial value of the intermediate product ($P^{(k=0)}$). At block 610, the example bounds determination circuitry 210 updates the finite upper bound ($c^{(k+1)}$) based on the value of the intermediate product ($P^{(k)}$) determined at block 608. For example, Equation 21 can be used to determine an updated value of the finite upper bound ($c^{(k+1)}$).

At block 612, the example iteration comparer circuitry 208 determines if the finite upper bound is converged. For example, the iteration comparer circuitry 208 determines if an error corresponding to a comparison of the subsequent finite upper bound ($c^{(k+1)}$) and current finite upper bound ($c^{(k)}$) satisfies a third error threshold. The example iteration comparer circuitry 208 can calculate an error by computing the mathematical difference between the subsequent finite upper bound ($c^{(k+1)}$) and the current finite upper bound ($c^{(k)}$). The third threshold error may be set or adjusted based on user and/or manufacture preferences. In some examples, the third error threshold is the same as the first and/or second error thresholds.

If the example iteration comparer circuitry 208 determines that the third error corresponding to the comparison of the subsequent finite upper bound ($c^{(k+1)}$) and current finite upper bound ($c^{(k)}$) does not satisfy the second error threshold (block 612: NO), the example bounds determination circuitry 210 replaces the current finite upper bound ($c^{(k)}$) with the subsequent finite upper bound ($c^{(k+1)}$) (block 614) and the process returns to block 608 to perform a subsequent iteration until the error is reduced to satisfy the third error threshold. If the example iteration comparer circuitry 208 determines that the third error corresponding to the comparison of the subsequent finite upper bound ($c^{(k+1)}$) and current finite upper bound ($c^{(k)}$) satisfies the second error threshold (block 612: YES), the example bounds determination circuitry 210 determines the finite upper bound (c) based on the current finite upper bound ($c^{(k)}$) (block 616).

Figure 7:
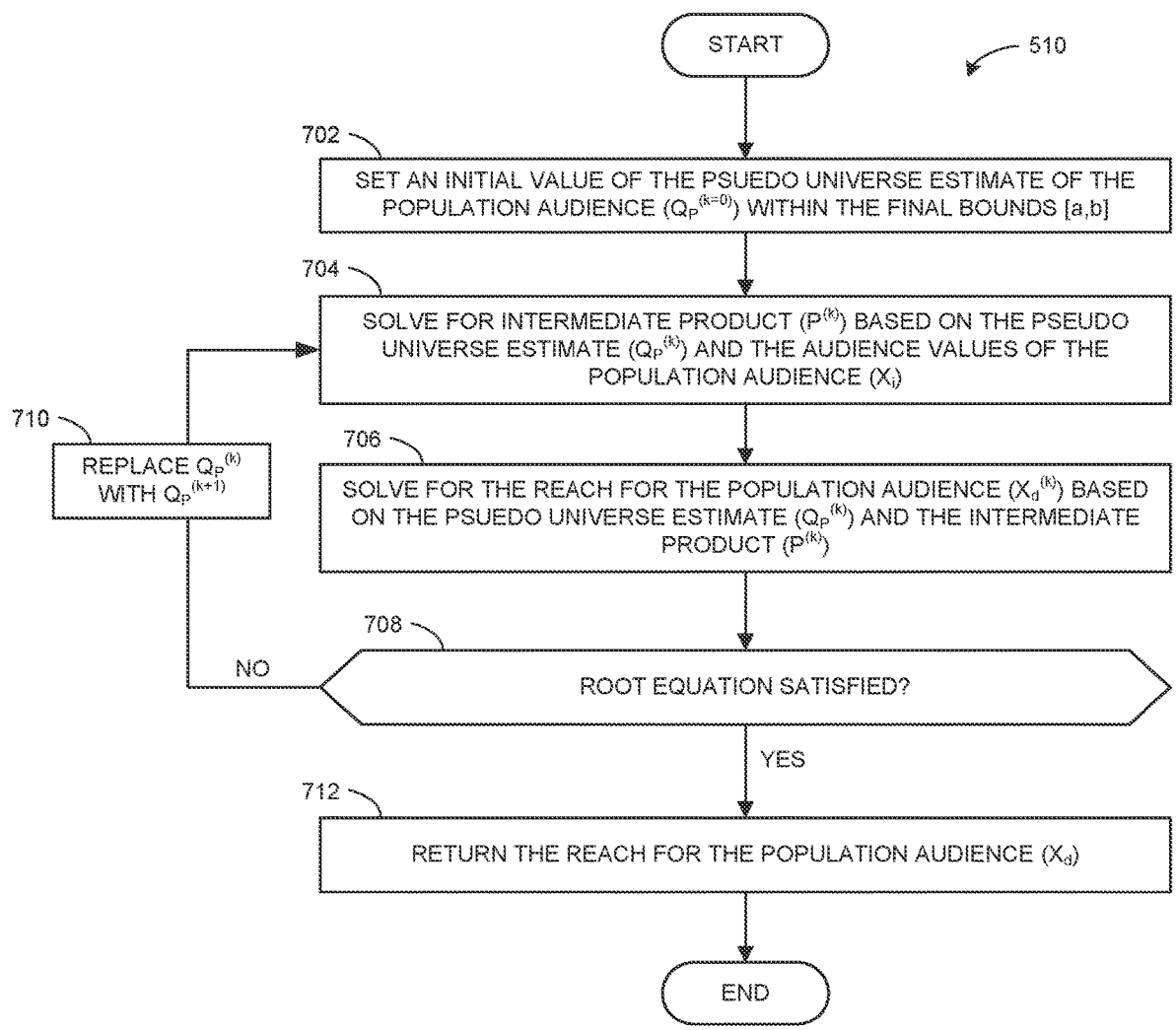

FIG. 7 is an example flowchart representative of example machine readable instructions 510 that may be executed by the example population reach determination circuitry 130 of FIGS. 1 and/or 2 to perform processing operations to determine reach (e.g., de-duplicated audience value for the population normalized to the population size) of the population audience. Although the instructions of FIG. 7 are described in conjunction with a reach determination based on quarter hour margins of media exposure from the example population reach determination circuitry 130 of FIGS. 1 and 2, the example instructions may be utilized to determine reach based on any type of media and/or marginals from any type of ratings data.

At block 702, the example pseudo universe determination circuitry 202 sets an initial value of the pseudo universe estimate ($Q_P^{k=0}$) of the population audience within the final bounds [a, b]. For example, the pseudo universe determination circuitry 202 can set the initial value of the pseudo universe estimate of the population audience to be the final lower bound (a). In another example, the pseudo universe determination circuitry 202 can set the initial value of the pseudo universe estimate of the population audience to be the final upper bound (b). In another example, the pseudo universe determination circuitry 202 can set the initial value of the pseudo universe estimate of the population audience to be any value between the final lower bound (a) and the final upper bound (b). In some examples, the pseudo universe determination circuitry 202 sets the initial value of the pseudo universe estimate of the population audience based on a numerical root finding algorithm (e.g., bisection method, regula falsi, etc.).

At block 704, the example pseudo universe determination circuitry 202 solves for the intermediate product $(P^{(k)})$ based on the pseudo universe estimate $(Q_P^{(k)})$ of the population audience and the audience exposure values $(X_1)$ of the population audience. For example, the pseudo universe determination circuitry 202 can use Equation 25 to solve for the intermediate product $(P^{(k)})$. At block 706, the example pseudo universe determination circuitry 202 solves for the reach (e.g., the de-duplicated audience value for the population normalized to the population size) for the population audience $(X_d^{(k)})$ based on the pseudo universe estimate $(Q_P^{(k)})$ and the intermediate product $(P^{(k)})$. For example, the pseudo universe determination circuitry 202 can use Equation 26 to solve for the reach for the population audience $(X_d^{(k)})$. At block 708, the root finder circuitry 212 tests if the root equation is satisfied using the values of the pseudo universe estimate $(Q_P^{(k)})$ and the reach for the population audience $(X_d^{(k)})$. For example, the root finder circuitry 212 can substitute the values of the pseudo universe estimate $(Q_P^{(k)})$ and the reach for the population audience $(X_d^{(k)})$ into the left-hand side of Equation 27. The example root finder circuitry 212 can test if the left-hand side of Equation 27 is equal to zero.

If the example root finder circuitry 212 determines that the root equation is not satisfied (e.g., the left-hand side of Equation 27 is not equal to zero) (block 708: NO), the example root finder circuitry 212 replaces the current pseudo universe of the population audience $(Q_P^{(k)})$ with a next iteration of the pseudo universe of the recorded audience $(Q_P^{(k+1)})$ (block 710) and the process returns to block 704 to perform a subsequent iteration until the root equation is satisfied (e.g., the left-hand side of Equation 27 is equal to zero). For example, the root finder circuitry 212 can update the value of the pseudo universe estimate of the population audience within the final bounds [a, b]. In some examples, the root finder circuitry 212 updates the value of the pseudo universe estimate of the population audience based on a numerical root finding algorithm (e.g., bisection method, regula falsi, etc.). If the example root finder circuitry 212 determines that the root equation is satisfied (e.g., the left-hand side of Equation 27 is equal to zero) (block 708: YES), the example root finder circuitry 212 determines the reach (e.g., the de-duplicated audience value for the population normalized to the population size) for the population audience $(X_d)$ based on the current reach for the population audience $(X_d^{(k)})$ (block 712).

Figure 8:
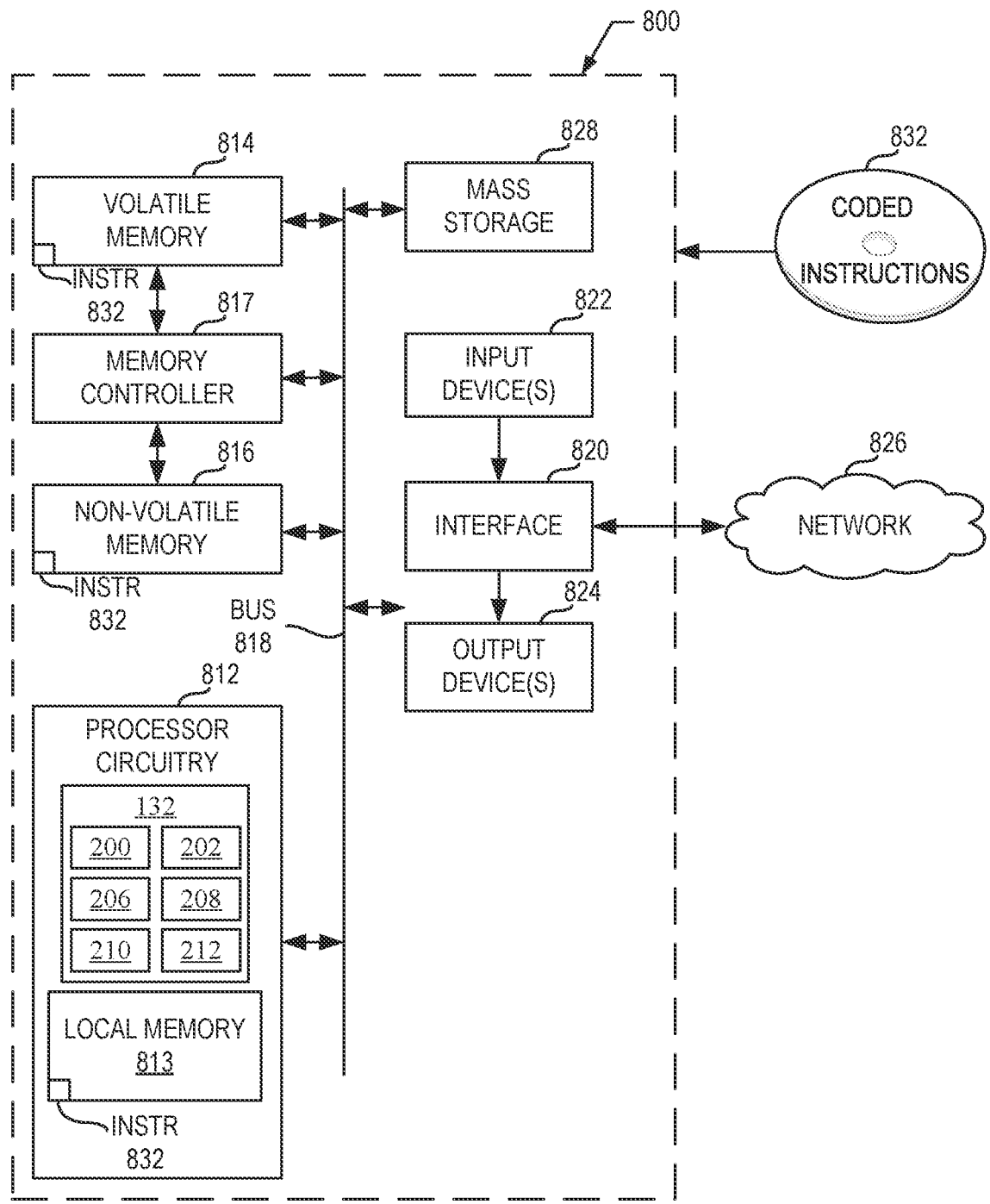
FIG. 8 is a block diagram of an example processing platform including processor circuitry structured to execute the example machine readable instructions of FIGS. 3-7 to implement the example population reach determiner.

FIG. 8 is a block diagram of an example processor platform 800 structured to execute and/or instantiate the machine readable instructions and/or operations of FIGS. 3-7 to implement the population reach determination circuitry 130 of FIGS. 1 and/or 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example population reach determination circuitry 130, the example interface 200, the example pseudo universe determination circuitry 202, the example reach determination circuitry 206, the example iteration comparer circuitry 208, the example bounds determination circuitry 210, and the example root finder circuitry 212.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIGS. 3-7, may be stored in the mass storage device 828, in the volatile memory 814, in the non-volatile memory 816, and/or on a removable non-transitory computer readable storage medium such as a CD or DVD.

Figure 9:
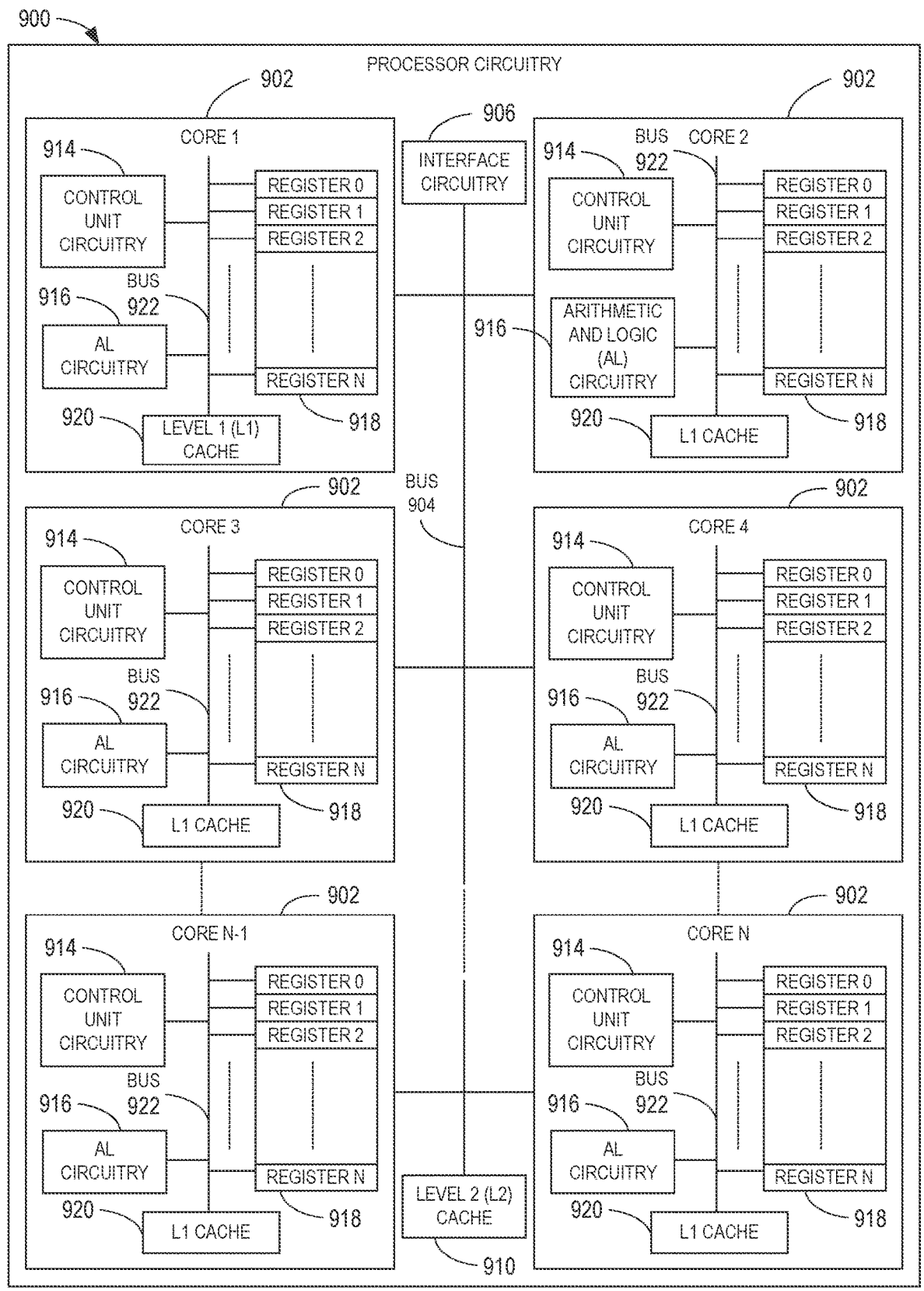
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowchart of FIGS. 3-7.

The cores 902 may communicate by an example bus 904. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally or alternatively, the bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The bus 922 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
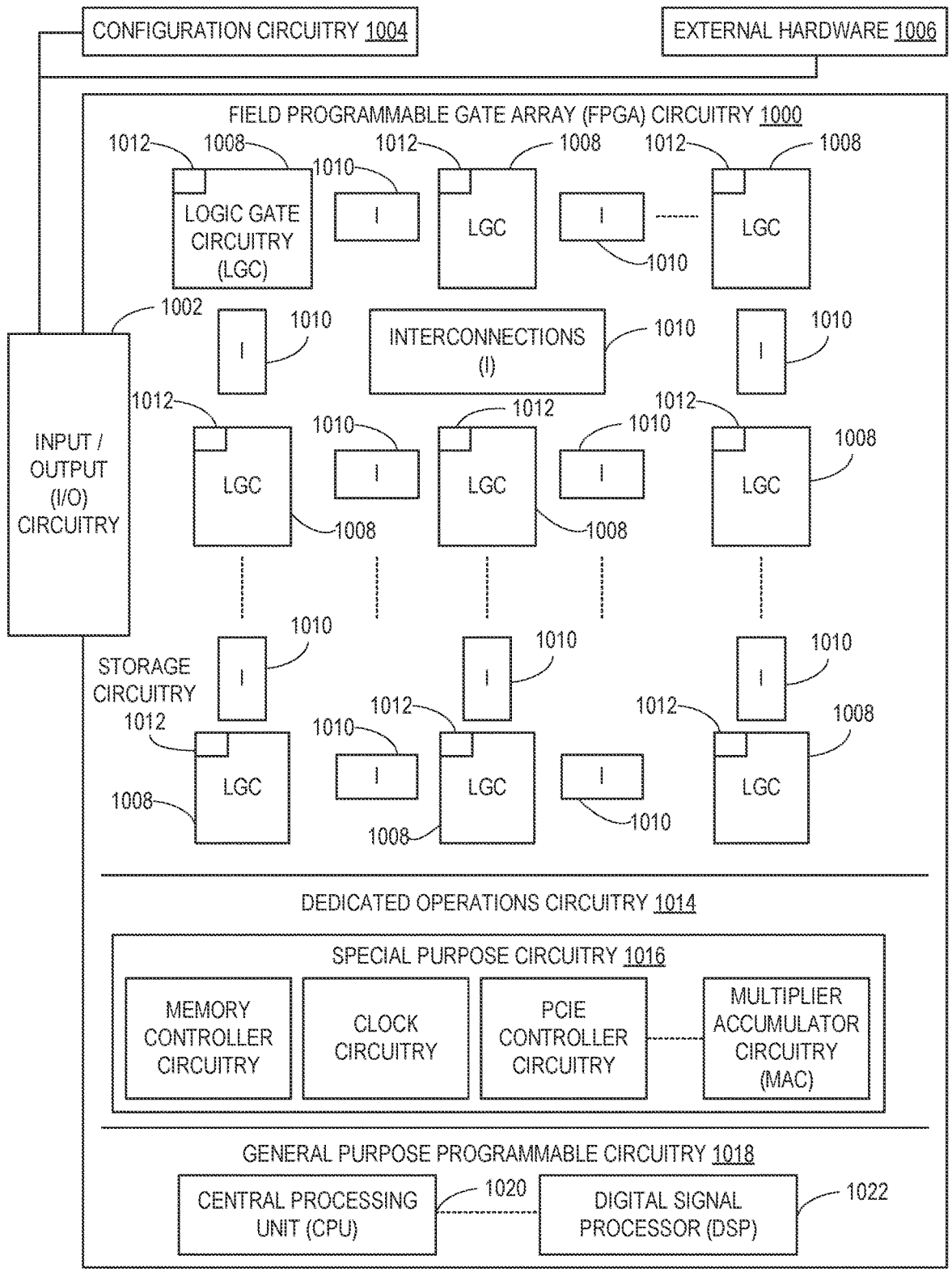
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. The FPGA circuitry 1000 can be used, for example, to perform operations that could otherwise be performed by the example microprocessor 900 of FIG. 9 executing corresponding machine readable instructions.

However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowchart of FIGS. 3-7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowchart of FIGS. 3-7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowchart of FIGS. 3-7. As such, the FPGA circuitry 1000 may be structured to effectively instantiate some or all of the machine readable instructions of the flowchart of FIG. 3-7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 3-7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 3-7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowchart of FIGS. 3-7 may be executed by one or more of the cores 902 of FIG. 9 and a second portion of the machine readable instructions represented by the flowchart of FIGS. 3-7 may be executed by the FPGA circuitry 1000 of FIG. 10.

In some examples, the processor circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
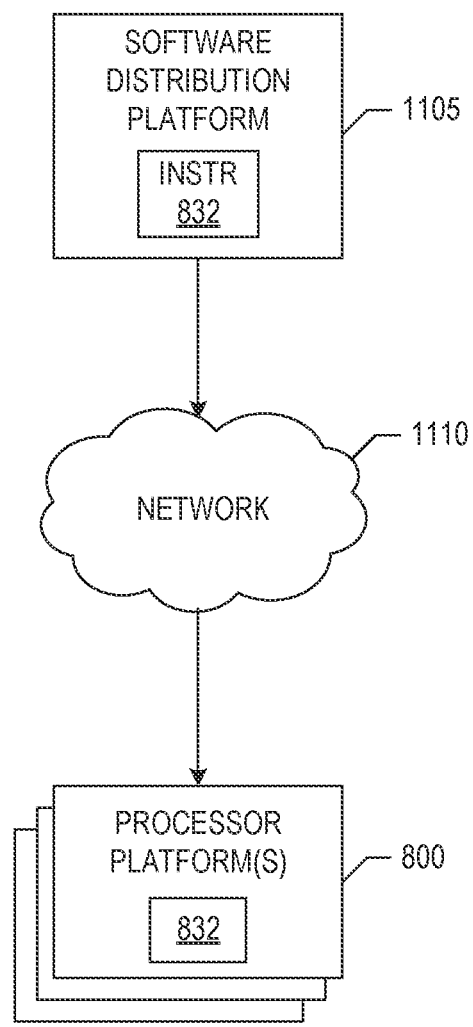
FIG. 11 is a block diagram of an example software distribution platform (e.g., one or more servers) to distribute software (e.g., software corresponding to the example machine readable instructions of FIGS. 3-7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions 300, 308, 506, 510 of FIGS. 3-7, as described above. The one or more servers of the example software distribution platform 1105 are in communication with a network 1110, which may correspond to any one or more of the Internet and/or any other network(s), such as the example network 826 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions 300, 308, 506, 510 of FIGS. 3-7, may be downloaded to the example processor platform 800, which is to execute the machine readable instructions 832 to implement the population reach determination circuitry 130. In some example, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

From the foregoing, it will be appreciated that example systems, methods, apparatus, and articles of manufacture have been disclosed that estimate population reach from marginals. Examples disclosed herein determine the reach analytically using the above Equations 25-27. Traditional techniques for determining reach from different margins include determining the reach numerically. However, such traditional techniques are unsolvable for a large number of margins due to memory and/or processing constraints. Examples disclosed herein alleviate the problems associated with such traditional techniques by determining the reach analytically (e.g., via solving the disclosed Equations). Using examples disclosed herein, reach can be determined from a near infinity number of margins. The disclosed systems, methods, apparatus, and articles of manufacture are accordingly directed to one or more improvement(s) in the operation of a machine such as a computer or other electronic and/or mechanical device.

Example apparatus, systems, and methods for estimating population reach from marginals are disclosed herein. Further examples disclosed herein include the following:

Example 1 includes an apparatus including at least one memory; instructions in the apparatus; and processor circuitry to execute the instructions to at least determine an audience relationship value based on first audience exposure values for a recorded audience of a media and a first de-duplicated audience value for the recorded audience of the media; determine bounds of a pseudo universe estimate of a population audience of the media based on the audience relationship value and second audience exposure values for the population audience of the media; and iteratively determine the pseudo universe estimate of the population audience and a second de-duplicated audience value for the population audience of the media based on the audience relationship value and the second audience exposure values, the pseudo universe estimate of the population audience to be within the bounds.

Example 2 includes the apparatus of example 1, wherein the processor circuitry is to iteratively converge on a pseudo universe estimate of the recorded audience of the media based on (A) the first de-duplicated audience value for the recorded audience of the media and (B) the first audience exposure values.

Example 3 includes the apparatus of example 2, wherein the processor circuitry is to determine the audience relationship value based on the pseudo universe estimate of the recorded audience.

Example 4 includes the apparatus of example 1, wherein the processor circuitry is to output the second de-duplicated audience value and the audience relationship value to an application that is to perform an operation based on at least one of the second de-duplicated audience value or the audience relationship value.

Example 5 includes the apparatus of example 1, wherein the processor circuitry is to determine the bounds of the pseudo universe estimate of the population audience based on a largest second audience exposure value and a sum of the second audience exposure values.

Example 6 includes the apparatus of example 5, wherein the processor circuitry is to determine a first intermediate range based on the largest second audience exposure value, a sum of the second audience exposure values, and the audience relationship value; determine a second intermediate range based on the largest second audience exposure value and the sum of the second audience exposure values; and determine the bounds of the pseudo universe estimate of the population audience based on a set intersection of the first intermediate range and the second intermediate range.

Example 7 includes the apparatus of example 6, wherein the processor circuitry is to iteratively converge on an upper bound of the second intermediate range.

Example 8 includes at least one non-transitory computer readable medium comprising instructions that, when executed, cause at least one processor to at least determine an audience relationship value based on first audience exposure values for a recorded audience of a media and a first de-duplicated audience value for the recorded audience of the media; determine bounds of a pseudo universe estimate of a population audience of the media based on the audience relationship value and second audience exposure values for the population audience of the media; and iteratively determine the pseudo universe estimate of the population audience and a second de-duplicated audience value for the population audience of the media based on the audience relationship value and the second audience exposure values, the pseudo universe estimate of the population audience to be within the bounds.

Example 9 includes the at least one non-transitory computer readable medium of example 8, wherein the instructions cause the at least one processor to iteratively converge on a pseudo universe estimate of the recorded audience of the media based on (A) the first de-duplicated audience value for the recorded audience of the media and (B) the first audience exposure values.

Example 10 includes the at least one non-transitory computer readable medium of example 8, wherein the instructions cause the at least one processor to determine the audience relationship value based on the pseudo universe estimate of the recorded audience.

Example 11 includes the at least one non-transitory computer readable medium of example 8, wherein the instructions cause the at least one processor to output the second de-duplicated audience value and the audience relationship value to an application that is to perform an operation based on at least one of the second de-duplicated audience value or the audience relationship value.

Example 12 includes the at least one non-transitory computer readable medium of example 8, wherein the instructions cause the at least one processor to determine the bounds of the pseudo universe estimate of the population audience based on a largest second audience exposure value and a sum of the second audience exposure values.

Example 13 includes the at least one non-transitory computer readable medium of example 12, wherein the instructions cause the at least one processor to determine a first intermediate range based on the largest second audience exposure value, a sum of the second audience exposure values, and the audience relationship value; determine a second intermediate range based on the largest second audience exposure value and the sum of the second audience exposure values; and determine the bounds of the pseudo universe estimate of the population audience based on a set intersection of the first intermediate range and the second intermediate range.

Example 14 includes the at least one non-transitory computer readable medium of example 13, wherein the instructions cause the at least one processor to iteratively converge on an upper bound of the second intermediate range.

Example 15 includes a method including determining, by executing an instruction with at least one processor, an audience relationship value based on first audience exposure values for a recorded audience of a media and a first de-duplicated audience value for the recorded audience of the media; determining, by executing an instruction with the at least one processor, bounds of a pseudo universe estimate of a population audience of the media based on the audience relationship value and second audience exposure values for the population audience of the media; and iteratively determining, by executing an instruction with the at least one processor, the pseudo universe estimate of the population audience and a second de-duplicated audience value for the population audience of the media based on the audience relationship value and the second audience exposure values, the pseudo universe estimate of the population audience to be within the bounds.

Example 16 includes the method of example 15, further including iteratively converging, by executing an instruction with the at least one processor, on a pseudo universe estimate of the recorded audience of the media based on (A) the first de-duplicated audience value for the recorded audience of the media and (B) the first audience exposure values.

Example 17 includes the method of example 15, further including determining, by executing an instruction with the at least one processor, the audience relationship value based on the pseudo universe estimate of the recorded audience.

Example 18 includes the method of example 15, further including outputting, by executing an instruction with the at least one processor, the second de-duplicated audience value and the audience relationship value to an application that is to perform an operation based on at least one of the second de-duplicated audience value or the audience relationship value.

Example 19 includes the method of example 15, further including determining, by executing an instruction with the at least one processor, the bounds of the pseudo universe estimate of the population audience based on a largest second audience exposure value and a sum of the second audience exposure values.

Example 20 includes the method of example 19, further including determining, by executing an instruction with the at least one processor, a first intermediate range based on the largest second audience exposure value, a sum of the second audience exposure values, and the audience relationship value; determining, by executing an instruction with the at least one processor, a second intermediate range based on the largest second audience exposure value and the sum of the second audience exposure values; and determining, by executing an instruction with the at least one processor, the bounds of the pseudo universe estimate of the population audience based on a set intersection of the first intermediate range and the second intermediate range.

Example 21 includes the method of example 20, further including iteratively converging, by executing an instruction with the at least one processor, on an upper bound of the second intermediate range.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:
1. An audience measurement system comprising:
a plurality of meters configured to monitor operation of first media devices in households; and
a computing system comprising a processor and a memory, the computing system configured to:
receive, via the Internet, media presentation data associated with operation of the first media devices monitored by the plurality of meters;
receive, from a service provider via the Internet, return path data associated with operation of second media devices;
determine an audience relationship value based on first audience exposure values for a recorded audience of a media and a first de-duplicated audience value for the recorded audience of the media, the first audience exposure values and the first de-duplicated audience value based on the media presentation data;
determine a first intermediate range based on (i) a largest second audience exposure value of a plurality of second audience exposure values for a population audience of the media, (ii) a sum of the second audience exposure values, and (iii) the audience relationship value, the second audience exposure values based on the return path data;
determine a second intermediate range based on the largest second audience exposure value and the sum of the second audience exposure values;
determine bounds of a pseudo universe estimate of the population audience of the media based on a set intersection of the first intermediate range and the second intermediate range;

iteratively determine the pseudo universe estimate of the population audience and a second de-duplicated audience value for the population audience of the media by iteratively updating an initial pseudo universe estimate based on the audience relationship value and the second audience exposure values to converge to a final pseudo universe estimate of the population audience that is within the bounds; and output the second de-duplicated audience value and the audience relationship value to an application that is to perform an operation based on at least one of the second de-duplicated audience value or the audience relationship value.

2. The audience measurement system of claim 1, wherein the computing system is configured to iteratively converge on a pseudo universe estimate of the recorded audience of the media based on (A) the first de-duplicated audience value for the recorded audience of the media and (B) the first audience exposure values.

3. The audience measurement system of claim 2, wherein the computing system is configured to determine the audience relationship value based on the pseudo universe estimate of the recorded audience.

4. The audience measurement system of claim 1, wherein the computing system is configured to iteratively converge on an upper bound of the second intermediate range.

5. At least one non-transitory computer readable medium comprising instructions that, when executed, cause at least one processor to at least:

receive, from a plurality of meters via the Internet, media presentation data associated with operation of first media devices monitored by the plurality of meters;

receive, from a service provider via the Internet, return path data associated with operation of second media devices;

determine an audience relationship value based on first audience exposure values for a recorded audience of a media and a first de-duplicated audience value for the recorded audience of the media, the first audience exposure values and the first de-duplicated audience value based on the media presentation data;

determine a first intermediate range based on (i) a largest second audience exposure value of a plurality of second audience exposure values for a population audience of the media, (ii) a sum of the second audience exposure values, and (iii) the audience relationship value, the second audience exposure values based on the return path data;

determine a second intermediate range based on the largest second audience exposure value and the sum of the second audience exposure values;

determine bounds of a pseudo universe estimate of the population audience of the media based on a set intersection of the first intermediate range and the second intermediate range;

iteratively determine the pseudo universe estimate of the population audience and a second de-duplicated audience value for the population audience of the media by iteratively updating an initial pseudo universe estimate based on the audience relationship value and the second audience exposure values to converge to a final pseudo universe estimate of the population audience that is within the bounds; and output the second de-duplicated audience value and the audience relationship value to an application that is to perform an operation based on at least one of the second de-duplicated audience value or the audience relationship value.

6. The at least one non-transitory computer readable medium of claim 5, wherein the instructions cause the at least one processor to iteratively converge on a pseudo universe estimate of the recorded audience of the media based on (A) the first de-duplicated audience value for the recorded audience of the media and (B) the first audience exposure values.

7. The at least one non-transitory computer readable medium of claim 5, wherein the instructions cause the at least one processor to determine the audience relationship value based on the pseudo universe estimate of the recorded audience.

8. The at least one non-transitory computer readable medium of claim 5, wherein the instructions cause the at least one processor to iteratively converge on an upper bound of the second intermediate range.

9. A method comprising:

receiving, from a plurality of meters via the Internet, media presentation data associated with operation of first media devices monitored by the plurality of meters;

receiving, from a service provider via the Internet, return path data associated with operation of second media devices;

determining, by executing an instruction with at least one processor, an audience relationship value based on first audience exposure values for a recorded audience of a media and a first de-duplicated audience value for the recorded audience of the media, the first audience exposure values and the first de-duplicated audience value based on the media presentation data;

determining, by executing an instruction with the at least one processor, a first intermediate range based on (i) a largest second audience exposure value of a plurality of second audience exposure values for a population audience of the media, (ii) a sum of the second audience exposure values, and (iii) the audience relationship value, the second audience exposure values based on the return path data;

determining, by executing an instruction with the at least one processor, a second intermediate range based on the largest second audience exposure value and the sum of the second audience exposure values;

determining, by executing an instruction with the at least one processor, bounds of a pseudo universe estimate of the population audience of the media based a set intersection of the first intermediate range and the second intermediate range;

iteratively determining, by executing an instruction with the at least one processor, the pseudo universe estimate of the population audience and a second deduplicated audience value for the population audience of the media by iteratively updating an initial pseudo universe estimate based on the audience relationship value and the second audience exposure values to converge to a final pseudo universe estimate of the population audience that is within the bounds; and outputting the second de-duplicated audience value and the audience relationship value to an application that is to perform an operation based on at least one of the second de-duplicated audience value or the audience relationship value.

10. The method of claim 9, further including iteratively converging, by executing an instruction with the at least one processor, on a pseudo universe estimate of the recorded audience of the media based on (A) the first de-duplicated audience value for the recorded audience of the media and (B) the first audience exposure values.

11. The method of claim 9, further including determining, by executing an instruction with the at least one processor, the audience relationship value based on the pseudo universe estimate of the recorded audience.

12. The method of claim 9, further including iteratively converging, by executing an instruction with the at least one processor, on an upper bound of the second intermediate range.

13. The audience measurement system of claim 1, wherein the application is select a targeted commercial to be provided to at least one of the first media devices or the second media devices.

14. The audience measurement system of claim 1, wherein the application is select secondary media to be provided to a secondary media device associated with at least one of the first media devices or the second media devices.

15. The at least one non-transitory computer readable medium of claim 5, wherein the application is select a targeted commercial to be provided to at least one of the first media devices or the second media devices.

16. The at least one non-transitory computer readable medium of claim 5, wherein the application is select secondary media to be provided to a secondary media device associated with at least one of the first media devices or the second media devices.

17. The at least one non-transitory computer readable medium of claim 5, wherein the instructions cause the at least one processor to execute the application.

18. The method of claim 9, wherein the application is select a targeted commercial to be provided to at least one of the first media devices or the second media devices.

19. The method of claim 9, wherein the application is select secondary media to be provided to a secondary media device associated with at least one of the first media devices or the second media devices.

20. The method of claim 9, further including executing the application with the at least one processor.

* * * * *